US008165965B2

(12) United States Patent
Ritter

(10) Patent No.: US 8,165,965 B2
(45) Date of Patent: Apr. 24, 2012

(54) TRANSACTION METHOD WITH A MOBILE APPARATUS

(75) Inventor: Rudolf Ritter, Zollikofen (CH)

(73) Assignee: Swisscom AG, Bern (CH)

( * ) Notice: Subject to any disclaimer, the term of this patent is extended or adjusted under 35 U.S.C. 154(b) by 1549 days.

(21) Appl. No.: 10/831,105

(22) Filed: Apr. 26, 2004

(65) Prior Publication Data
US 2004/0199474 A1    Oct. 7, 2004

Related U.S. Application Data

(63) Continuation of application No. 09/462,117, filed as application No. PCT/CH98/00086 on Mar. 5, 1998, now abandoned.

(51) Int. Cl.
G06Q 20/00 (2012.01)
G07F 7/08 (2006.01)

(52) U.S. Cl. .............................. 705/65; 705/41; 705/44
(58) Field of Classification Search .................. 705/76, 705/65; 235/379, 380; 700/213
See application file for complete search history.

(56) References Cited

U.S. PATENT DOCUMENTS

| 4,661,658 | A |   | 4/1987  | Matyas |
|-----------|---|---|---------|--------|
| 4,701,601 | A |   | 10/1987 | Francini et al. |
| 4,960,983 | A | * | 10/1990 | Inoue ............................ 235/449 |
| 4,965,568 | A |   | 10/1990 | Atalla et al. |
| 5,453,601 | A | * | 9/1995  | Rosen ........................... 705/65 |
| 5,590,038 | A | * | 12/1996 | Pitroda .......................... 705/41 |
| 5,602,919 | A |   | 2/1997  | Hurta et al. |
| 5,629,981 | A | * | 5/1997  | Nerlikar ....................... 713/168 |
| 5,677,955 | A | * | 10/1997 | Doggett et al. ................ 705/76 |
| 5,748,737 | A | * | 5/1998  | Daggar .......................... 705/41 |
| 5,796,832 | A |   | 8/1998  | Kawan |
| 5,878,138 | A |   | 3/1999  | Yacobi |
| 5,887,266 | A | * | 3/1999  | Heinonen et al. ............ 455/558 |
| 5,892,211 | A | * | 4/1999  | Davis et al. .................. 235/380 |
| 5,898,154 | A | * | 4/1999  | Rosen ........................... 235/379 |
| 5,917,913 | A | * | 6/1999  | Wang ............................. 705/67 |
| 5,943,624 | A | * | 8/1999  | Fox et al. .................... 455/556.1 |
| 5,960,086 | A | * | 9/1999  | Atalla ............................ 380/44 |
| 5,991,749 | A |   | 11/1999 | Morrill, Jr. |

(Continued)

FOREIGN PATENT DOCUMENTS

EP    0 708 547 A2    4/1996

(Continued)

OTHER PUBLICATIONS

Applied Handbook of Crytography, Menezes et al., 1997 CRC Press, pp. 30-31.*

(Continued)

*Primary Examiner* — Evens J Augustin
(74) *Attorney, Agent, or Firm* — Pillsbury Winthrop Shaw Pittman, LLP

(57) ABSTRACT

A transaction method between a client and a terminal (2) connected to a telecommunication network comprises the transmission of at least one client identification (IDUI), a terminal identification (POSID), and transaction-specific data to a financial server connected to the telecommunication network.

The terminal identification is read or entered in the terminal and transmitted by the telecommunication network to the financial server. The client is equipped with a SIM card which can be connected functionally to a mobile apparatus. The client identification transmitted to the financial server is read in the memory of the SIM card and transmitted to the financial server via at least one interface.

36 Claims, 16 Drawing Sheets

U.S. PATENT DOCUMENTS

| | | | |
|---|---|---|---|
| 6,000,607 A * | 12/1999 | Ohki et al. | 235/379 |
| 6,010,239 A * | 1/2000 | Hardgrave et al. | 700/213 |
| 6,016,476 A | 1/2000 | Maes et al. | |
| 6,047,270 A | 4/2000 | Joao et al. | |
| 6,076,078 A | 6/2000 | Camp et al. | |
| 6,092,057 A | 7/2000 | Zimmerman et al. | |
| 6,098,055 A | 8/2000 | Watanabe | |
| 6,105,008 A * | 8/2000 | Davis et al. | 705/41 |
| 6,148,192 A * | 11/2000 | Ahvenainen | 455/410 |
| 6,189,098 B1 | 2/2001 | Kaliski, Jr. | |
| 6,240,301 B1 * | 5/2001 | Phillips | 455/558 |
| 6,282,522 B1 * | 8/2001 | Davis et al. | 705/41 |
| 6,308,317 B1 | 10/2001 | Wilkinson et al. | |
| 6,418,326 B1 * | 7/2002 | Heinonen et al. | 455/558 |
| 6,490,443 B1 * | 12/2002 | Freeny, Jr. | 455/406 |
| 6,594,692 B1 * | 7/2003 | Reisman | 709/219 |
| 6,859,650 B1 * | 2/2005 | Ritter | 455/406 |
| 7,093,767 B2 * | 8/2006 | Faenza et al. | 235/493 |

FOREIGN PATENT DOCUMENTS

| | | |
|---|---|---|
| EP | 0 758 777 A2 | 2/1997 |
| EP | 0 780 802 A2 | 6/1997 |
| WO | 94/11849 | 5/1994 |
| WO | 96/13814 | 5/1996 |
| WO | 96/18981 | 6/1996 |

OTHER PUBLICATIONS

Grigorova, et al., "SIM Cards," Telecommunications Journal of Australia, vol. 43, No. 2, 1993 (Specification, p. 6, line 10).

O'Mahony et al., Electronic Payment Systems, 1997, Artech House, Inc., pp. 61-123.

Bowry, "Smart cards get clever applications," Nov. 1993, Telecommunications (International Edition), v27n11, pp. 47-50.

Urrows et al., "The future of transactional card technologies," Jul.-Aug. 1989, Optical Information Systems, v9, n4 p. 190 (19).

* cited by examiner

*FIG. 10*
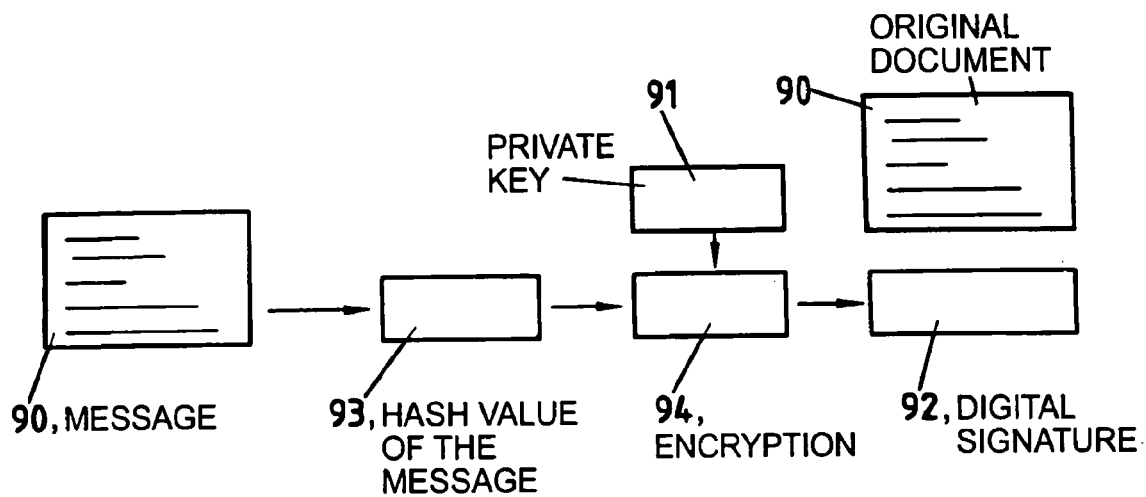
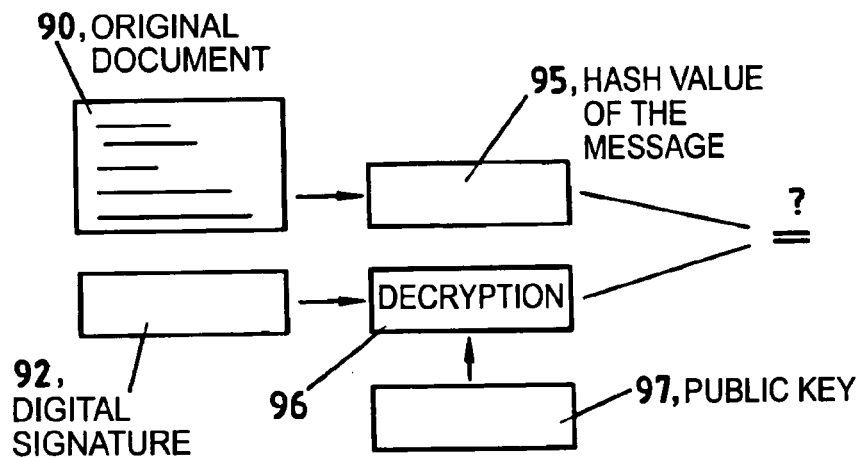
*FIG. 11*

TRANSACTION METHOD WITH A MOBILE APPARATUS

This application is a continuation application of U.S. patent application Ser. No. 09/462,117 filed Dec. 23, 1999, now abandoned which is a national phase application of PCT/CH98/00086 filed Mar. 5, 1998, which claims priority to Switzerland Patent Application No. 1564/97, filed Jun. 27, 1997, the contents of which are incorporated herein in their entireties.

The present invention relates to a method and a system for transmitting orders in a telecommunication network. The invention relates particularly to a transaction method between a client and a fixed point-of-transaction apparatus which is connected by a telecommunication network to a server, and a device suited to this transaction method.

According to the prior art, transactions between a customer (or client, C) and a terminal, here called point-of-transaction (POT), for example, a point-of-sale (POS), are often carried out by means of an electronic payment card. Debit and credit cards are used, for example, at cash desks in shops, at service stations, etc. The card usually comprises storage means, for example, a magnetic strip and/or a chip in which the identification of the client is stored, among other things. In order to carry out a transaction with the owner or operator of a POT, for example, in order to pay for an article in a shop, the client must insert his card in a suitable card reader in the POT apparatus. The POT then reads the client's identification stored in the card, ascertains and displays the amount to be paid, checks the client's solvency, if need be, and prompts the client to confirm the transaction by means of a confirmation key on the POT apparatus. If the client is solvent and has entered his confirmation, the client identification, the amount to be paid, and possible a POT identification are transmitted over a telecommunication network to a financial server connected to the POT and administered by a financial institution. The client's account at this financial institution is debited accordingly, either immediately or subsequently.

A drawback of this method is the necessity of having to insert the client's card in an outside apparatus. Clients do not normally have their cards handy but rather in their wallets, for instance. A very quick transaction is, therefore, not possible. Sometimes, too, the aperture for insertion of the card in the POT reading apparatus is not easily accessible. This is especially true when the POT is an automatic ticket dispenser for a parking garage or an automated payment machine which a motorist is supposed to be able to operate without getting out of his car. Moreover, fraudulent acts or the non-authorized reading of storage areas of the card may be carried out in the POT.

Even though certain chip cards, e.g., debit and credit cards, contain a microprocessor, these cards are substantially passive elements which store data. It is this data which is memorized and used by the electronics of the POT. The client, on the other hand, normally has no possibility of accessing the data directly without going to a teller's window or an automated teller machine of the respective financial institution which issued the card. Hence it is difficult for the client to check the transactions carried out by means of the card or to keep account of them.

Such cards contain a client identification, but one which permits the clients to be identified only to the issuing financial institution. Normally, therefore, a card can be used for a financial transaction only if the client and the POT operator are associated with the same financial institution. On the other hand, the card is not intended to be used for other types of transactions, for example, for non-financial transactions where reliable identification of the client or card-holder is needed. For the client, therefore, it is indispensable to have a large number of cards for all kinds of financial or no-financial transactions, for example, several debit or credit cards administered by different financial institutions or chain stores, or subscriber cards or admission cards for protected zones. Such cards are usually protected by different PIN codes which the client must laboriously memorize.

In the event of theft or a fraudulent act involving the card, it must be blocked. However, blocking cannot take place until the card is inserted in a respective apparatus. Ordinary credit cards, however, can continue to be used in manually operated apparatuses; hence, secure blocking of the card is not possible.

Besides debit and credit cards, there are so-called e-cash cards which make it possible to store sums of money electronically and which are then accepted as payment means at various POT locations. In order to provide these cards with further sums, clients must present them at teller windows or automated teller machines of a financial institution, which is not always possible.

In patent application EP 708 547 A2, a method and a device arrangement are described, according to which credit can be granted to a client by means of mobile radio telephones during the acquisition of products and services. According to the method described in EP 708 547 A2, the client and the salesperson concerned agree on a transaction password which is transmitted by the client by means of his mobile radio telephone, together with an apparatus number of the mobile radio telephone and the number assigned to this mobile radio telephone, to a receiving part of a device near the salesperson. In the device near the salesperson, a salesperson identification as well as a transaction amount are added to the data received from the client, and all this information is transmitted to a credit center where the credit rating of the client concerned is clarified, and the respective result is transmitted to the salesperson.

In patent application WO 94/11849, a method is described according to which financial transactions can be carried out by means of SIM cards (Subscriber Identity Module), which are connected to mobile radio telephones. In the method described in WO 94/11849, the client concerned is authenticated by the services of the mobile radio network on the basis of his SIM card after this client has entered a personal code for the authorized use of this SIM card, and via a dedicated communication network, a connection is established to a financial institution chosen by the client, where various financial transactions can be carried out. The communication terminal for insertion of the SIM card is, for instance, installed in a retail outlet and can be used by the client to enter a sum of money which is inquired of at the chosen financial institution and, after receipt, is debited to the client and confirmed as a credit note to the outlet via the communication terminal by means of a payment number.

An object of the present invention is to propose a method or system which allows the above-mentioned problems to be avoided.

A further object of the present invention is to propose a transaction method which is suitable for both financial and non-financial transactions and which is simpler and more reliable than the usual transaction methods.

According to the present invention, these objects are achieved particularly by the elements of the independent claims. Further advantageous embodiments follow, moreover, from the dependent claims and the description.

In particular, these objects are achieved by means of a transaction method between a client and a POT apparatus (for example, a point-of-sale, POS) connected to a telecommunication network, wherein the apparatus is connected by this telecommunication network to a server. The method comprises the linking, in the POT apparatus, of at least one client identification to a POT-apparatus identification, which is read or entered in the POT apparatus, and to transaction-specific data, into a transaction voucher. The method further comprises the transmission of this transaction voucher through the telecommunication network to the server. The client identification is stored in the memory of a portable identification element of the client, which contains at least one processor, and is set up such that it can communicate via a contact-free interface with the POT apparatus, the client identification being read in the identification element and transmitted through the contract-free interface to the POT apparatus. A debit order, which comprises at lest the transaction-specific data and the client identification, is transmitted from the POT apparatus directly through the contact-free interface for verification to the client's identification element prior to the transmission of the transaction voucher to the server.

In a related embodiment, the server can communicate with a mobile system (for example, a mobile apparatus having an identification card) via an air interface, for example, through a mobile radio network. When the transaction is a financial one, a further sum of money to be stored in the mobile apparatus can thereby be charged from the server by means of electronic messages transmitted via the air interface. The sum of money is preferable defined in a standard currency.

The contact-free transmission between the mobile system and the POT apparatus may, for example, take place through an electromagnetic interface integrated in the identification card or in the mobile apparatus, for example, in the form of an inductive coil, or through an infrared transceiver system.

The transaction vouchers are preferably encoded by means of a symmetrical algorithm before they are forwarded to the server, the symmetrical algorithm using a session key encoded by means of an asymmetrical algorithm. Moreover, the transaction vouchers are preferably additionally certified before they are forwarded to the financial server. Ensuring a secure end-to-end transmission link between the mobile system and the financial server is preferred.

The present invention will be better understood with the aid of the description given, as an example, and illustrated by the accompanying figures:

FIG. 10 shows a block diagram explaining the signing of messages.

FIG. 11 shows a block diagram explaining the verification of the signature.

The method illustrated in FIGS. 5a, 5b, 5c and 6a, 6b, 6c can be carried out with any desired system shown in FIGS. 1 to 4. The first and second modifications both require a mobile apparatus or a SIM card having an additional infrared or inductive interface, to be described in detail below.

Figure 1:
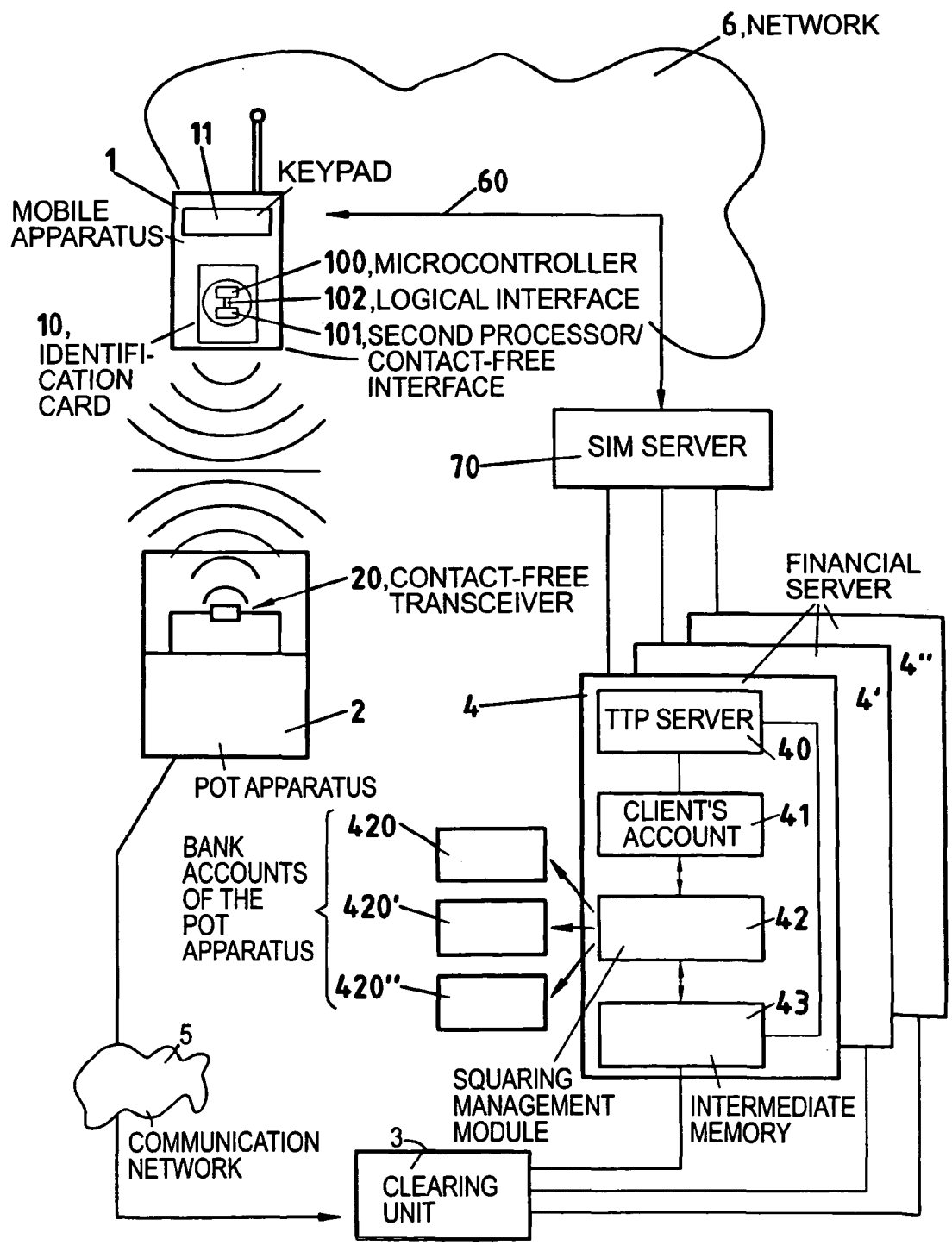
FIG. 1 shows a block diagram showing the information flow in a first embodiment of the system of the invention, the client being equipped with a mobile radio telephone, preferably a Global System for Mobile Communications (GSM).

FIG. 1 shows the information flow in a first embodiment of the invention. The client is equipped with a mobile system, in this case a GSM mobile apparatus 1. The mobile apparatus 1 contains an identification card 10, for example, a SIM card, by means of which the client is identified in a network 6, preferably a GSM network. The SIM card comprises a conventional microcontroller 100 embedded in the plastic support body of the card which is responsible for the GSM functionalities of the card, as they are described, for example, in the article "SIM CARDS," by T. Grigorova and I. Leung which appeared in the Telecommunication Journal of Australia, Vol. 43, No. 2, 1993, pp. 33-38, and for new functionalities loaded on the SIM cards at a later date. The SIM card further comprises contact means (not shown) for communicating with the mobile apparatus 1 in which it is inserted.

The SIM card 10 further comprises a second processor 101 (contact-free chip-card interface (CCI) responsible for the contact-free connection to a POT apparatus 2. The second processor 101 carries out, among other things, the TTP (trusted third-party) functions, described below, in order to receive and send coded and signed messages. A logic interface 102 connects the two processors 100 and 101.

The contact-free interface with the POT apparatus 2 may, for example, comprise at least one coil (not shown), integrated in the SIM card 10 and connected to the second processor 101, by means of which data are inductively transmitted in both directions over a radio communication route. In another embodiment, an inductive coil may also be integrated in the housing of the mobile apparatus. Still, in another embodiment, the contact-free interface comprises an infrared transceiver on the housing of the mobile apparatus. The contact-free communication between the two apparatuses is preferably encoded, for example, by means of a Data Encryption Algorithm (DEA), Data Encryption Standard (DES), Triple Data Encryption Standard (TDES), Rivest Shamir Adleman (RSA), or Elliptic Curve Cryptography (ECC) security algorithm.

For inductive signal transmission from the POT to the chip card, a phase-modulation process is preferably utilized, whereas in the opposite direction, amplitude modulation of the signals is preferred.

The SIM card preferably contains a special field International Debit User Identification (IDUI) by means of which the client is identified by the POT operator and/or by a financial institution. The IDUI identification is preferably stored in a protected memory area of one of the two processors, 100 or 101. The IDUI contains at least an identification of the network operator, a user number which identifies him from other clients with the same network operator, a user class indication defining which services he may use, and optionally, a country identification as well. Moreover, the IDUI contains security data, including a transaction counter Tc, a charging token $CT_C$, and a time-out field, TO, indicating the validation time. The function of these various data will be explained below.

The symbolically depicted POT apparatus 2 is likewise provided with a contact-free transceiver 20, for example, an inductive coil or an infrared transceiver. This interface allows the mobile system 1, 10 to communicate contact-free with the apparatus 2 in both directions.

The terminal or POT apparatus 2, e.g., a POS in a shop, may be specially equipped with a radio communication interface 20. However, the POT apparatus 2 may also be intended for non-financial applications, for example, as a code for an admission-checking device ("electronic gatekeeper") which permits coming and going in a protected locality, for example, a hotel room, business, theatre, cinema, or within an amusement park. The POT apparatus 2 is identified by means of a special field Point-of-Sale Identification (POSID). The POSID depends upon the application. In the case of a cash desk, it contains an identification of the network operator, an area identification (sub-district in a country) a POS number identifying it from other POS, with the same network operator, a POS class indication defining what services it may use or offer, the date, time, currency used (Special Drawing Rights ((SDR)), euros, or dollars) and optionally a country identification as well.

The POT apparatus 2 is preferably provided with data-entry means (not shown), for example, a keypad, and with display means (not shown), for example, a screen.

The IDUI is transmitted to the POT via the contact-free interface 10, 101 and linked in the POT apparatus 2 to the POSID and to additional data specific to the transaction, for example, or entered debit amount A, such that an electronic transaction voucher is created. This voucher then is encoded by means of a Trusted third-party (TTP) or point-to-point (PTP) process, and signed. Additional explanations concerning the TTP process are given below in an appendix.

The transaction voucher is then transmitted via a modem (not shown) and a communication network 5, for example, a public fixed network or a mobile radio network, to a clearing unit 3 likewise connected to the network. The unit 3 receives the electronic vouchers from various POT apparatuses 2, independent of the country or traffic area, and independent of the country or financial institution of the client. In the clearing unit 3, these transaction vouchers are sorted according to the financial institution, possibly according to the operator as well, and sent to the respective financial institutions. Clearing units are already known per se in GSM technology and are used, for instance, for collection and further distribution of connection charges. The clearing unit 3 may, for example, contain a data base indicating the financial institution with which the client, previously identified by means of his IDUI, is associated.

The electronic transaction vouchers handled by the clearing unit 3 are forwarded to a financial server 4, 4', or 4" of the respective financial institution. In the financial server 4, 4', or 4", the transaction vouchers submitted are first decoded and stored in an intermediate memory 43. A squaring management module 42 then credits the amount signed by the client to the respective bank accounts 420, 420', and/or 420" of the POT operator. These accounts may be administered by the same or a different financial institution. Moreover, the squaring management module 42 carries out checking entries in the client's account. The client's account 41 with the financial institution is debited accordingly, or the transaction data are stored for later checking. The financial server 4, 4', or 4" further contains a TTP server 40 for encoding and signing vouchers and messages by means of the trusted third-party (TTP) algorithm. Additionally, each financial server 4, 4', or 4" is connected to a SIM server 70, for example, to a SICAP™ server. The SICAP™ process has been described in the patent EP689368, for example, and enables the exchange of files, programs, and also sums of money between the SICAP™ server 70 and the ISM card 10 in the mobile apparatus 1 over the public GSM network 6 (arrow 60). Other transmission protocols may also be used for data transmission between the SIM server 70 and the SIM card 10. For instance, the SIM card 10 can be recharged using the SICAP™ process, as described in detail below. The SIM server 70 further makes controlled communication possible between the client and the TTP server 40 at the financial institution.

Figure 2:
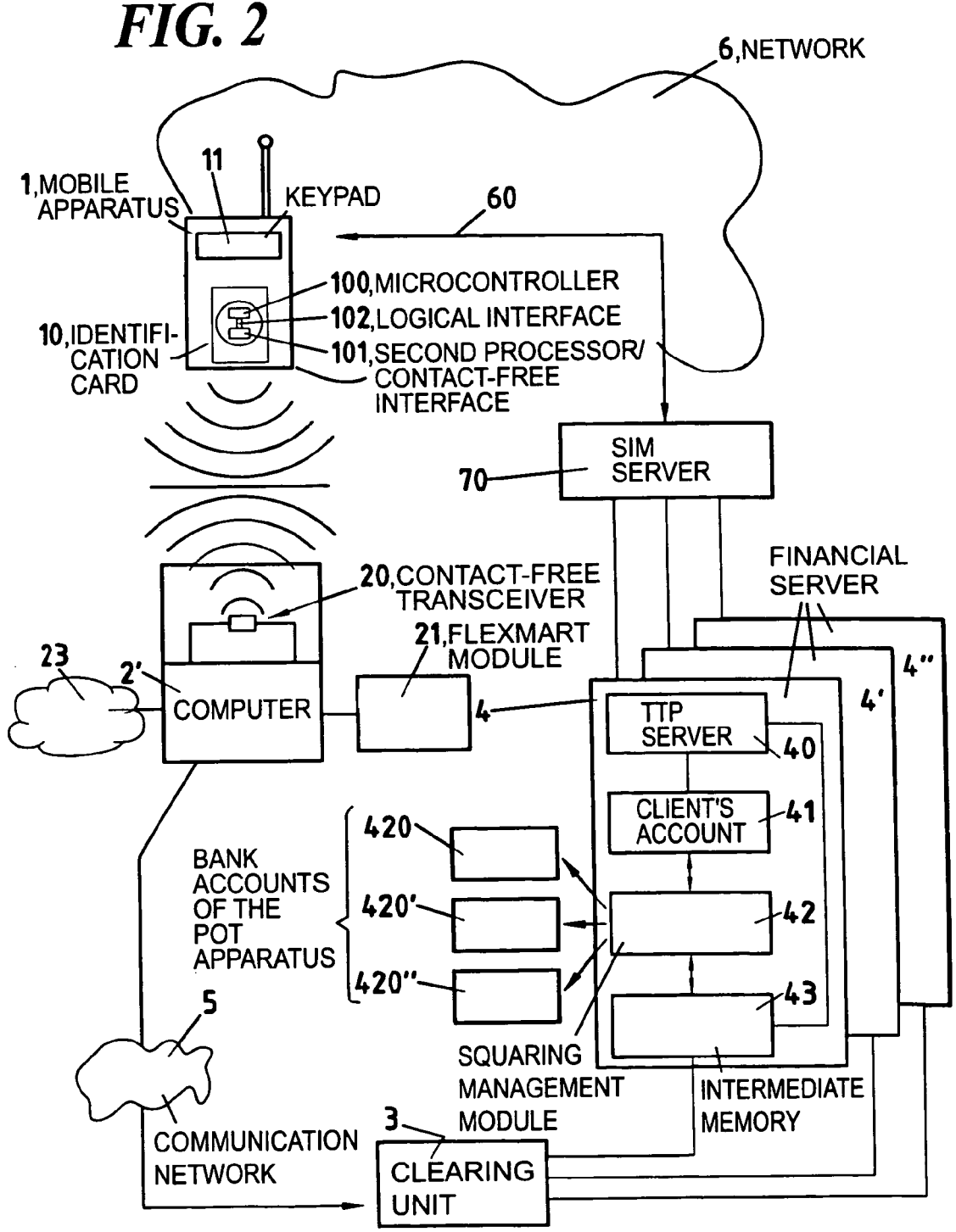
FIG. 2 shows a block diagram showing the information flow in a second embodiment of the invention, the client being equipped with a mobile radio telephone, preferably a GSM mobile apparatus which can receive and send special short messages, and the POT apparatus having Internet or Intranet capability.

FIG. 2 shows the information flow in a second embodiment of the invention. As in the first embodiment, the client is equipped with a mobile system, for example, a GSM mobile radio telephone 1 having a SIM card, preferably a SIM card having SICAP™ capability. The mobile system 1 likewise contains an inductive or infrared interface by means of which a contact-free connection to a POT apparatus 2' can be carried out. In this way, data and/or programs can be exchanged in both directions between the POT apparatus 2' and the SIM card 10 in the mobile system.

In this case, however, the POT apparatus 2' is a computer, preferably connected to a network, for example, on the Internet or in an Intranet. Various types of information or offers, for example, offers of products, may be displayed on the monitor of the computer 2' by means of a suitable menu. The client can control computer 2' with his mobile apparatus 1. For example, he can control the position of a cursor in a menu of products or information offered for sale by operating the cursor-shifting keys on the keypad 11 of his mobile apparatus 1. The cursor-shifting instructions are transmitted to the computer 2' via the contact-free interface between 10, 101 and 2', 20. The user presses a confirmation key, for example, the #-key on his keypad, in order to confirm the selected menu option, for example, to order a product.

The client identification stored in the mobile system 1, 10 is linked in an electronic transaction voucher to the POT apparatus 2 identification and to the transaction-specific data corresponding to the selected menu option. The electronic transaction voucher is then TTP or PTP encoded and signed. The transaction voucher preferably contains a client IDUI extracted from the SIM card 10, a supplier identification corresponding to the selected menu option, and a product identification corresponding to the selected menu option, preferably in the Flexmart format as proposed in patent application PCT/CH96/00464. This voucher is established by a Flexmart module 21. The Flexmart module 21 is preferably a software application run by the computer 2'.

Analogously, as in the first embodiment, the electronic transaction voucher is then transmitted by the clearing unit 3 to the respective financial server 4, 4', or 4" and processed there.

Figure 3:
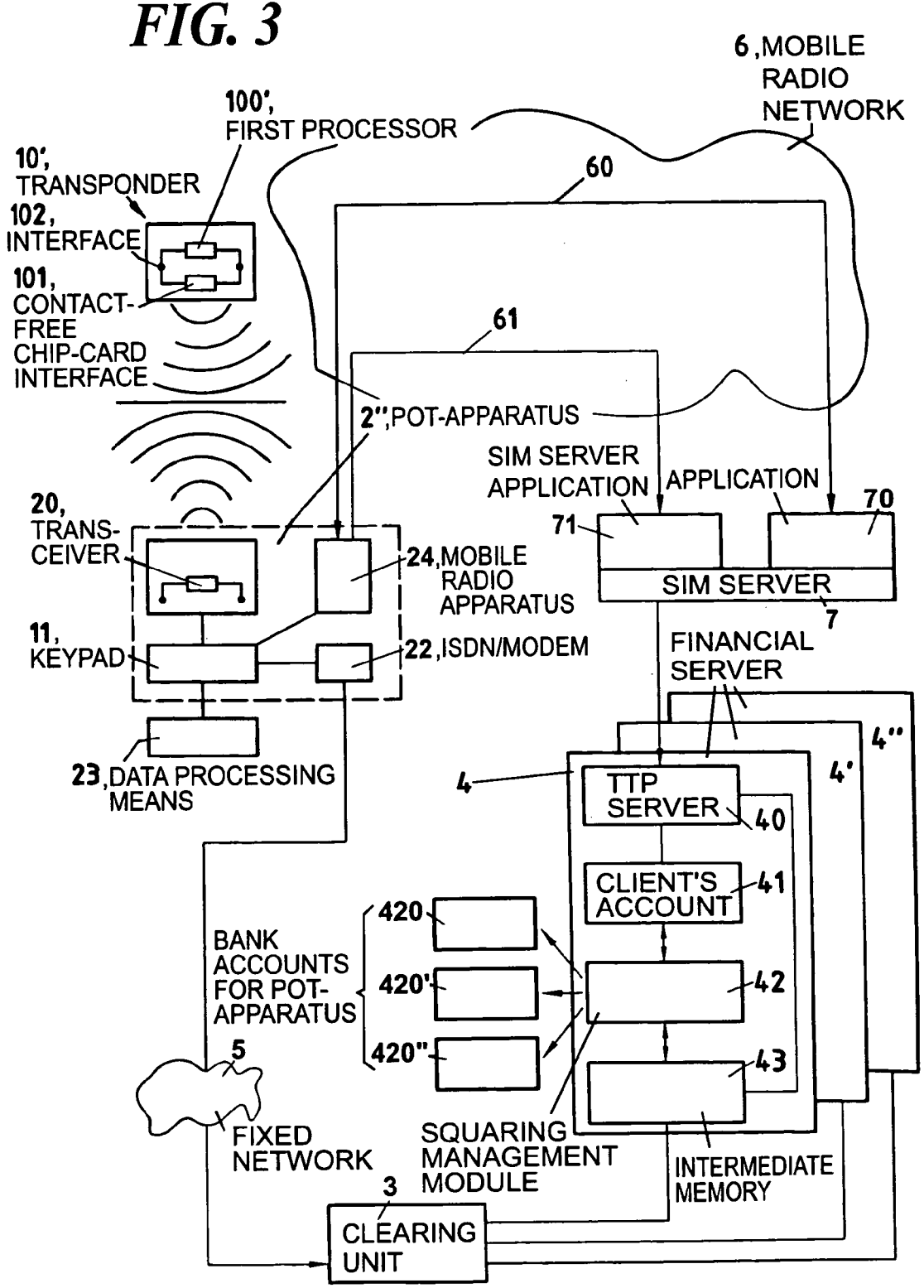
FIG. 3 shows a block diagram showing the information flow in a third embodiment of the invention, the client being equipped with a transponder capable of processing at least special short messages, and the POT apparatus being capable of receiving and/or sending special short messages, for example, Short Message Service (SMS) or Unstructured Supplementary Service Data (USSD) short messages.

FIG. 3 shows the information flow in a third embodiment of the invention. In this embodiment, the client is not equipped with a complete mobile apparatus but only with a transponder 10' which may be integrated in a chip card, for instance, or in any object, such as a watch, a ring, or a keyring. The transponder might also be integrated in a remote control, for example, an infrared remote control, and communicate with a POT apparatus 2" via this remote control. The transponder 10' contains a first processor 100' by means of which special short messages, for example, SMS or USSD short messages, can be sent, received, and encoded. In a preferred embodiment, the first processor 100' contains SICAP™ and/or TTP modules by means of which files and programs can be exchanged with a server 7 by SMS or USSD short messages. However, the first processor 100' does not contain any mobile radio functions, hence, the transponder cannot be used as a SIM card in a mobile radio apparatus.

A second chip 101 (contact-free chip-card interface, (CCI)) is connected to the chip 100' through an interface 102 and is responsible for the contact-free connection to the apparatus 2". It is also possible to use a single chip performing both functions. In this case, the contact-free connection preferably takes place by means of at least one inductive coil in the transponder 10'.

The POT apparatus 2" comprises, in this case, a transceiver 20 for contact-free communication with the transponder 10', a data-processing means 23' having a keypad 11, and a mobile radio apparatus 24, preferably a reduced GSM apparatus which can receive and send only special short messages, such as SMS or USSD short messages. The keypad is used by the client as an input means.

The GSM apparatus 24 integrated into the POT apparatus 2" and reduced to the transmission of short messages makes possible the transmission of messages through the mobile radio network 6 between the transponder 10' and a first application 70 in the SIM server 7, thus providing the wherewithal for the encoded recharging and/or check-up process (arrow 60) and the voucher transfer (arrow 61) from the client to a SIM server application 71 in the SIM server 7, for example, a SICAP™ server. In another embodiment, the encoded recharging and/or check-up process and the voucher transfer may also take place via a modem or an ISDN connection 22 and a fixed network 5.

The messages and vouchers are then transmitted by the mobile radio network 6 via the contact-free interface 10', 101 and 2", 20 and then over the mobile radio routes 60 and 61 of mobile radio network 6.

Figure 4:
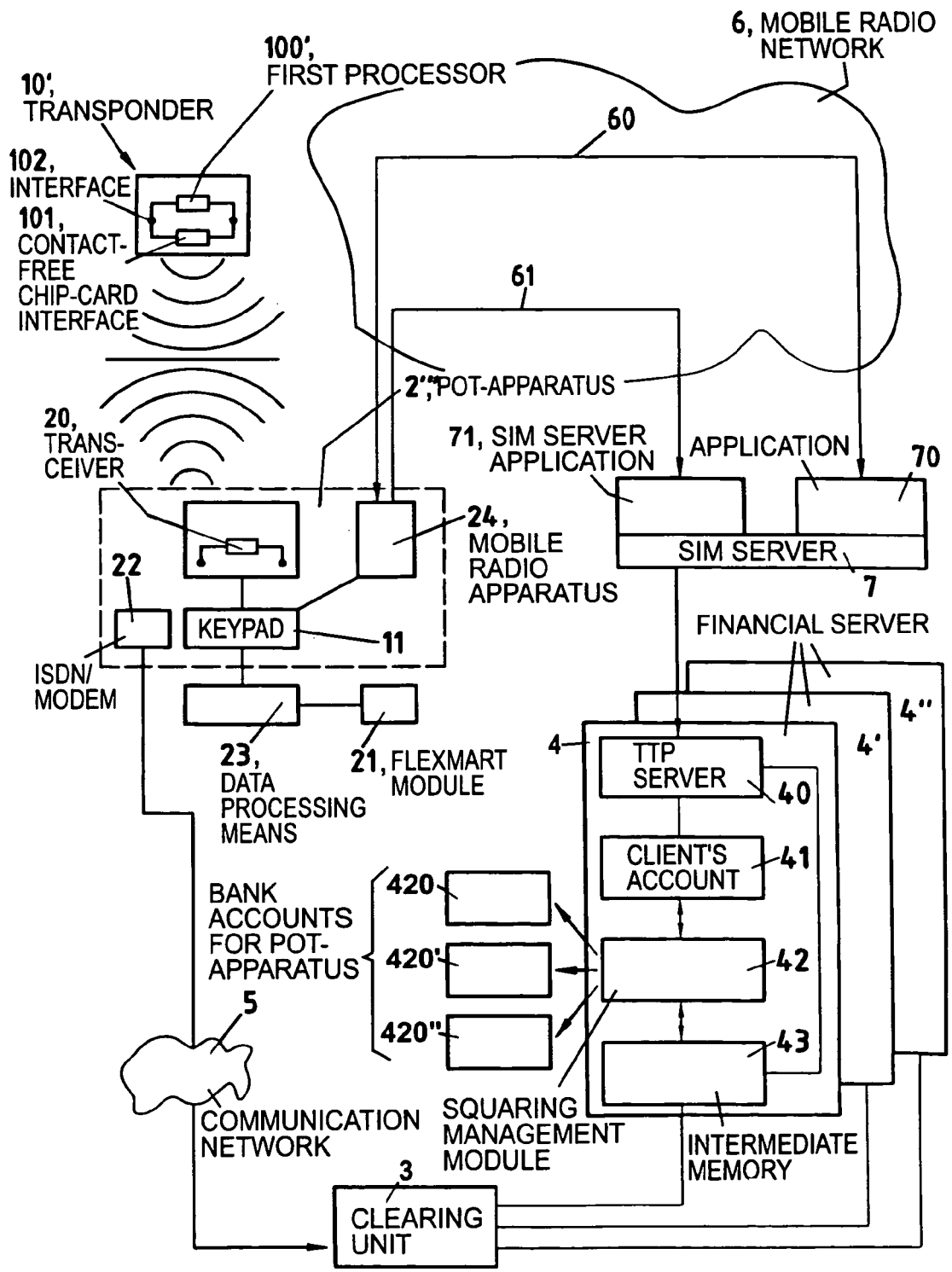
FIG. 4 shows a block diagram showing the information flow in a fourth embodiment of the invention, the client being equipped with a transponder capable of carrying out at least some SICAP™ procedures, and the POT apparatus having Internet or Intranet capability and being capable of receiving and/or sending short messages, for example, SMS or USSD short messages.

FIG. 4 shows the information flow in a fourth embodiment of the invention. As in the third embodiment, the client is not equipped with a complete mobile apparatus but only with a transponder 10'. As in the second embodiment, the POT apparatus 2''' is connected to a data-processing means 23 having a Flexmart module 21. The client communicates with the SIM server 7 by means of a restricted mobile radio apparatus 24, such as that used in the embodiment of FIG. 3.

By means of the Flexmart module 21, order messages may be prepared in a standardized format for a product or information supplier, as described in International Patent Application PCT/CH96/00464.

A payment transaction method will now be described in detail with the aid of FIGS. 5A, 5B, and 5C. This method may be applied to any of the embodiments of the invention illustrated in FIGS. 1 to 4. However, this sequence of operations is generally applicable and not limited to GSM processes.

Figure 5A:
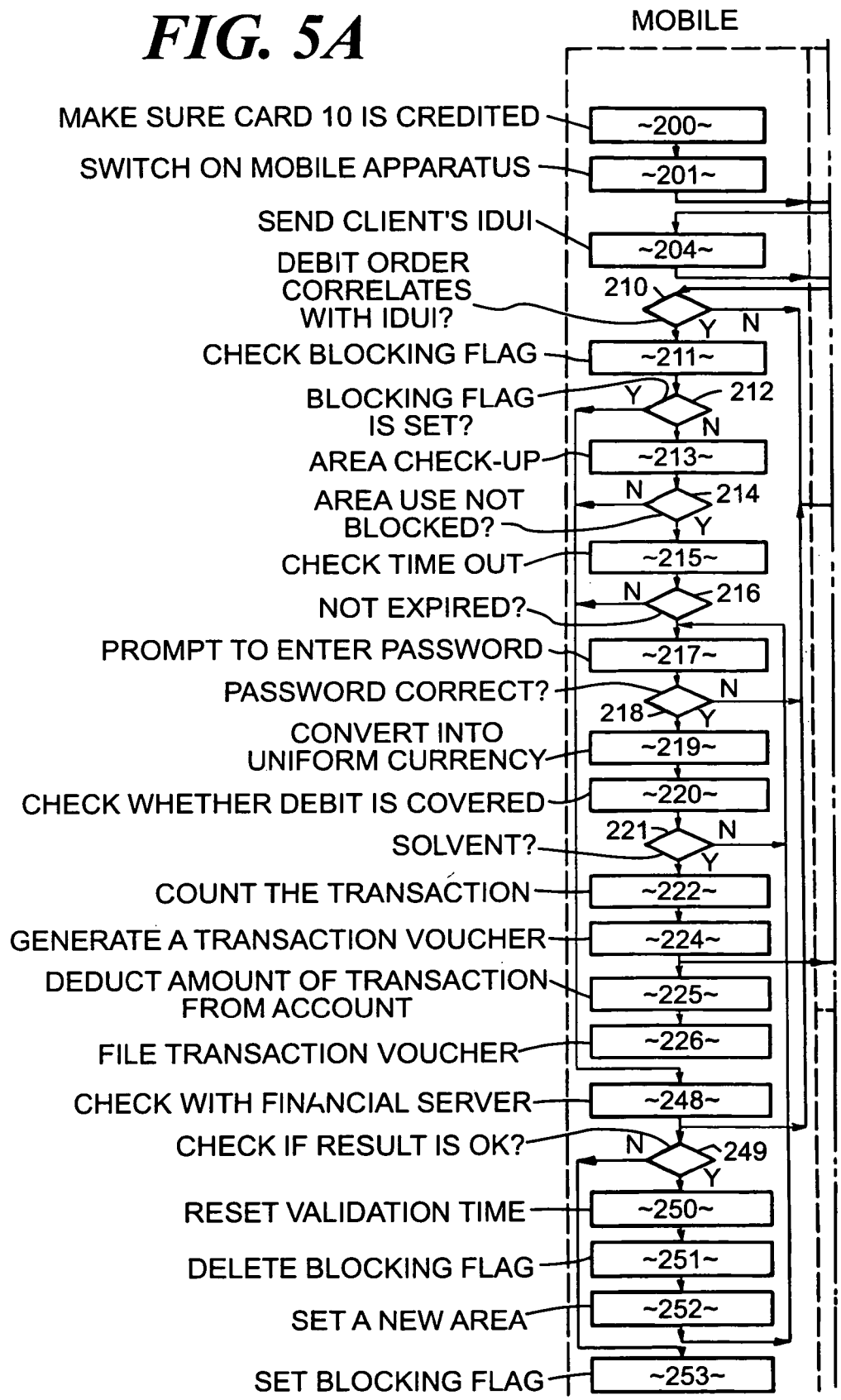
FIGS. 5A and 6A are flowcharts of a client in different embodiments of the inventive payment transaction method.
Figure 5B:
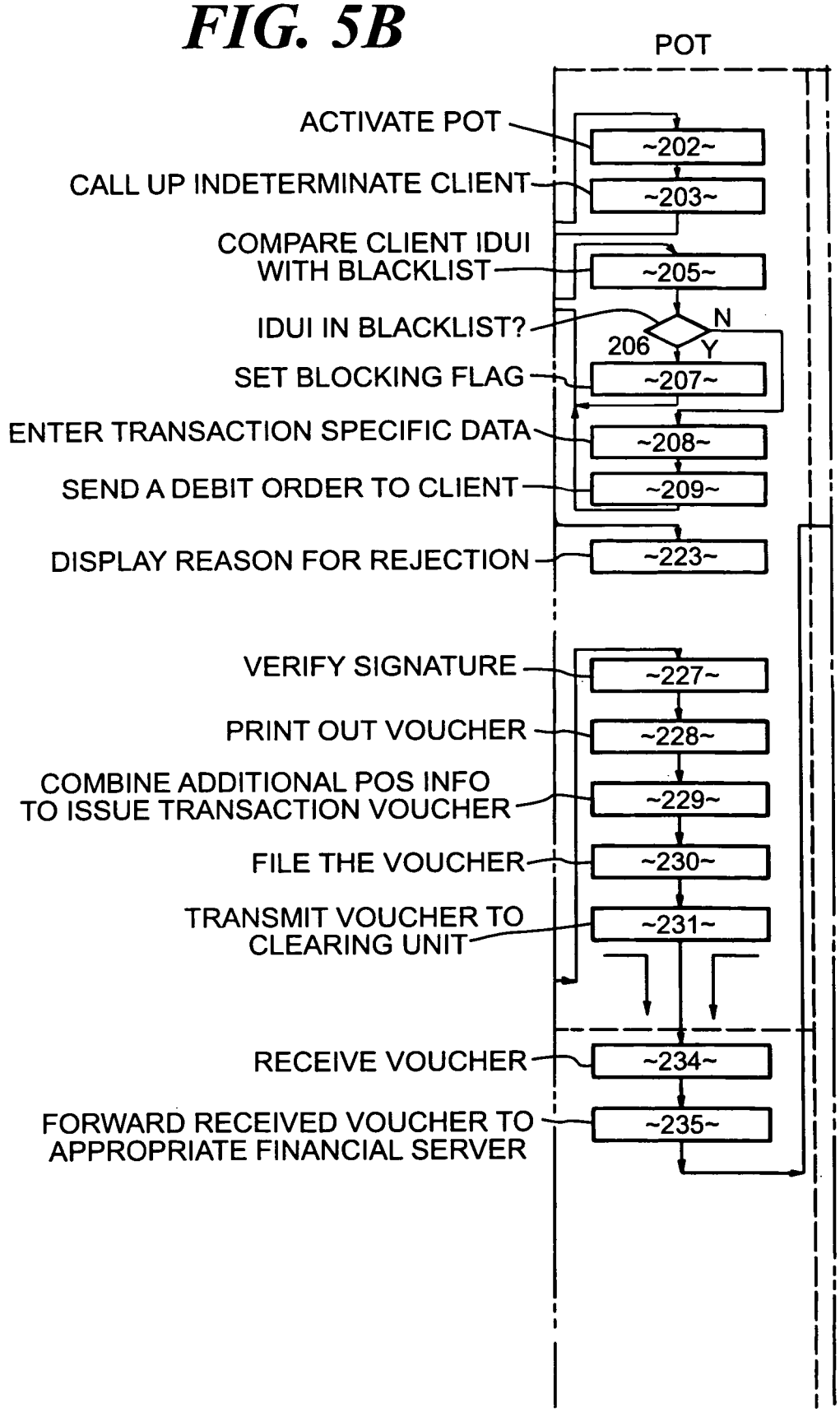
FIGS. 5B and 6B are flowcharts of a POT-apparatus in different embodiments of the inventive payment transaction method.

FIG. 5A shows the process steps involving chiefly the client's mobile system 1; FIG. 5B describes the process steps carried out by the POT apparatus 2; FIG. 5C relates to the operations of the financial server 4 and the effects upon the various accounts at the financial institution. It must be noted, however, that many process steps may be carried out either with the mobile system 1, for example, as a process within the SIM card 10, or in the POT apparatus 2. For example, the data input may take place by means of either the POT or the mobile system 1 if the latter has a keypad, such as a GSM mobile apparatus.

This method presupposes in step 200 (FIG. 5A) that the client's identification card 10, here a value card, is credited with a sum of money (e-cash). Value cards are already known per se; we shall explain in detail below with reference to FIG. 6 how they may be recharged. Moreover, patent application EP968105570.0 describes a method of recharging SIM cards with a sum of money.

The mobile system 1 or 10 is switched into operational state, for example, by switching on the mobile apparatus, in step 201 (FIG. 5A). The POT apparatus 2 is likewise activated in step 202. The POT apparatus 2 then calls up in step 201 (FIG. 5B) in a broadcast process the next, indeterminate client (card paging).

When the connection has been established between the POT apparatus and the mobile system 1, 10, the mobile system furnishes to the POT apparatus in step 204 (FIG. 5A) the client's IDUI (international debit user identification) and the confirmation that he is solvent. Whether the solvency is adequate cannot yet be determined at this time.

The POT apparatus 2 contains a blacklist or a revocation list (the terms "blacklist" and "revocation list" are used interchangeably hereafter), preferably updated periodically by the financial server 4, of clients to be barred. The IDUI transmitted by the client is compared with the blacklist (step 205). If the IDUI furnished by the client is found in the blacklist (step 206), a blocking flag is set in step 207. If no entry is found, the data specific to the transaction, for example, a debit amount A to be paid, may be entered on the keypad 11 of the POT apparatus 2. As a modification, the amount A may also be entered on the keypad of the mobile apparatus 1. The POT apparatus 2, or in a modification the SIM card 10, then links these transaction-specific data with the identification of the POT apparatus 2 and the IDUI and sends this debit order to the client. In addition, a reference currency, such as SDR, euros, or dollars, is preferably included as well.

Since the communication is signed, it can be checked in step 210 (FIG. 5A) whether the debit order correlates with the IDUI. If not, the reason for rejection is displayed on the POT apparatus 2 (step 223) (FIG. 5B). Otherwise, the processing returns to FIG. 5A where a blocking flag is checked in step 211. If one is set, a check-up with the financial server 4 takes place (step 248). If none is set, an area check-up takes place (step 213). SIM cards may thereby be blocked according to area of use. If the area check-up is negative, a check-up with the financial server 4 takes place (step 248); otherwise, a time-out check-up is made (step 215). It is checked whether the validation time during which transactions may be carried out without check-up has already expired. If the validation time has expired (216), a check-up with the financial server takes place (step 248); otherwise, the client is prompted in step 217 to enter his user password manually on the mobile apparatus 1. If the password entered is correct (step 248), the amount A is converted (219), if need be, into the uniform currency (say, SDR). This makes possible international utilization of the concept. Otherwise, in step 223, of FIG. 5B the rejection is displayed on the POT apparatus 2 with indication of the reason.

The mobile system 1/10 then checks in step 220 (FIG. 5A) whether the amount A to be debited is covered by the sum of money credited on the card (solvency check). If not, this reason for rejection is displayed on the screen of the POT apparatus (step 223 in FIG. 5B).

When all these checks have taken place, the transaction is counted in step 222 of FIG. 5A by means of a transaction counter Tc which is incremented. This count corresponds to the number of transactions executed with the card 10. In step 224, the debit amount A, the POT apparatus identification POSID, and the user identification IDUI are then linked in a transaction voucher which is additionally certified, optionally encoded, and possibly also compressed. The ECC method (elliptic curve crypto system), for example, may be used for the certification. A suitable certification and encoding method will be described in detail below by way of example.

The debited amount, A, is deducted from the card account in step 225, and the transaction voucher is filed in step 226 in a stack on the identification element 10. This card stack of the client's can be retrieved by the financial server, 4, 4', 4", if necessary, for the purpose of a detailed check. Preferably, the client himself can display the transaction vouchers stored in the stack on his mobile apparatus.

After step 224, the transaction voucher is supplied to the POT apparatus 2 for settlement. The client may optionally sign the transaction voucher with a digital signature. A digital signature may be produced based on the content of the transaction voucher. For example, the hash value of the transaction voucher may be computed and then encrypted using a private key. The transaction voucher is then signed with the encrypted hash value. Details of how to generate a digital signature based on the hash value of the transaction voucher are discussed in the Appendix. The signature is verified by the POT apparatus (step 227). Optionally, in step 228, a voucher is printed out on paper for the client.

In step 229, the debit voucher is then linked in the POT apparatus 2 with any additional POS data, and the transaction voucher is electronically signed by the POT apparatus, and optionally compressed and encoded. For example, a symmetrical encoding scheme or an asymmetrical encoding scheme may be alternatively adopted for encoding purposes. Details related to different encoding schemes are discussed in the Appendix. The electronic transaction voucher prepared in this way is then optionally filed in step 230 in a stack in the POT apparatus 2. The stack contains transaction vouchers of various clients. The transaction vouchers are then transmitted individually or in groups to the clearing unit 3 during step 231. Transmission may take place either immediately after the transaction, or a number of transaction vouchers may be transmitted from the stack at periodic intervals (for example, every hour or every day). A batch process for transmitting all transaction vouchers during the night, for instance, may also be used.

The clearing unit 3 receives individual or grouped transaction vouchers from a plurality of POT apparatuses 2 in the same geographical zone (step 234). A plurality of geographically distributed clearing units may be provided. In step 235, the clearing unit 3 assigns the transaction vouchers received from various POT apparatuses 2 to the respective financial institutions or service providers and forwards these transaction vouchers accordingly.

If the transaction vouchers are encrypted, they must first be decoded by the clearing unit 3 in order to be assigned to a financial server 4, 4', or 4", then re-encrypted by the clearing unit 3 in order to be forwarded. In a preferred embodiment, however, the data elements needed for clearing in the IDUI and possibly POSID fields of the transaction voucher are not encrypted by the POT apparatus 2. Secure, end-to-end encoded transmission of the transaction vouchers between the POT apparatus 2 and the financial servers 4, 4', and 4" can thereby be achieved.

Figure 5C:
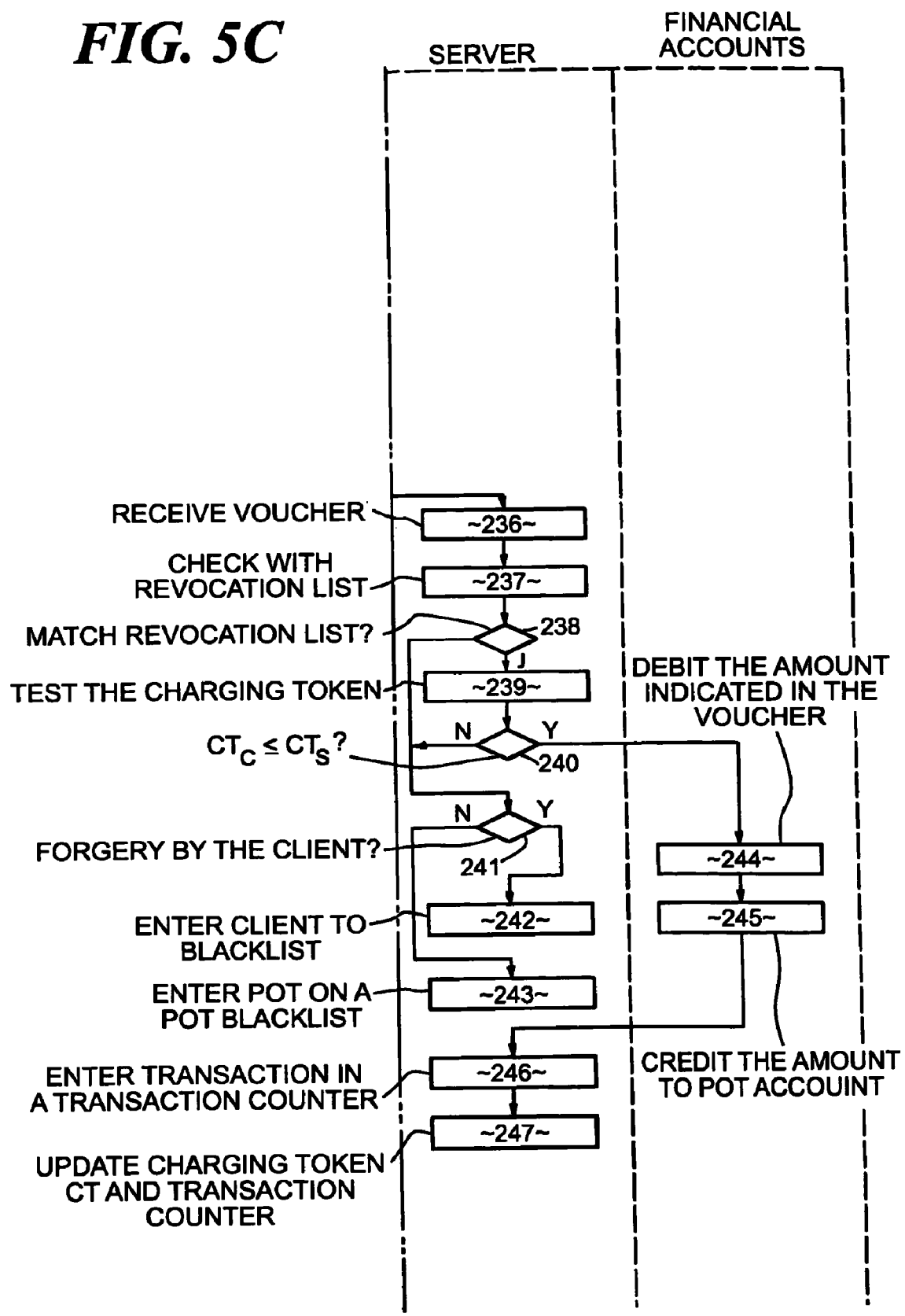
FIGS. 5C and 6C are flowcharts of a server in different embodiments of the inventive payment transaction method.

In FIG. 5C, the responsible financial server receives the transaction vouchers in step 236, and the TTP server 40 decompresses and decodes them (if necessary) and verifies the authenticity of the signatures of the POT apparatus and of the client. In step 237 it is checked whether the POSID and/or the IDUI are to be found on a revocation list. If the test is negative (238) because neither the POT apparatus identification nor the client identification IDUI is on a revocation list, a test of the charging token CT takes place in step 239. The charging token CT gives the number of times the card 10 has been recharged. This charging token is updated in the financial server ($CT_S$) and in the card ($CT_c$) after each recharging process, as described below. A copy of the charging token $CT_c$ is transmitted in the field IDUI in the transaction voucher. The charging token $CT_c$ communicated by the mobile system 1, 10 must be the same as the charging token $CT_S$ stored in the financial server 4. If recharging vouchers are still underway between the financial server 4 and the mobile system 1, 10, $CT_c$ may also be temporarily smaller than $CT_s$. The financial server 4 therefore checks whether $CT_c \leq CTC_s$.

If this condition is not verified in step 240, an unauthorized recharging process has probably been carried out, and the process goes on to step 241. Here it is distinguished whether the forgery was committed by the POT or by the client. If the client is responsible, he is entered in step 242 on a blacklist. A client-barring voucher is preferably generated and sent to the client's mobile system 1, 10 in order to set the blocking flag and block this system, as well as to all POT apparatuses 2, or at least to all POT apparatuses 2 in a predefined geographical area, in order to enter this client on the blacklist of these POTs 2. If, on the other hand, the problem was caused by the POT apparatus 2, the assisted POT apparatus 2 is entered on a POT blacklist in step 243.

If the charging-token test is passed in step 240, the amount, A, in the transaction voucher may be debited in step 244 to the client's account 41 at the respective financial institution. Other modes of payment, for example, via credit card or against an invoice, are also possible within the scope of the present invention. In step 245, the amount, A, is credited accordingly to an account 420, 420', or 420" of the POT operator at a financial institution. Service charges may also be debited by a financial institution, and/or by the POT operator, or by the network operator, to the POT account 420, 420' or 420", and/or to the client's account 41.

In step 246, the financial server 4, 4' or 4" then enters this transaction in the transaction counter. A process then takes place in step 247 for updating the values of the charging token CT and the transaction counter Tc in the mobile system.

Reverting to the process in the mobile system 1, 10 in FIG. 5A, as already explained this system goes to step 248 if a security problem is ascertained in steps 212, 214, or 216. In this case, a complete check-up takes place with the financial server, preferably via the mobile radio system 6. The check-up comprises, for example, a test and a renewal of the authentication certificate, as well as a verification of all parameters, for example, the charging token CT, the transaction counter Tc, the blacklist, etc. If the result of the check-up is negative, the blocking flag is set so that the mobile system 1, or at least the respective application in the SIM card 10, is blocked (step 253). If, on the contrary, this check indicates that most probably no forgery has been attempted, the validation time is reset in step 250. By means of the validation time, the mobile system, for example, can be blocked if it is not used within a predefined period of time, for example, a year. Hence this indication must be reset after each use. The blocking flag is then deleted in step 251, and a new area is set in step 252.

It is important to note that the debiting process may take place with differing currencies, for example, on the basis of the SDR (special drawing rights), customary in the sphere of telecommunications, or by means of some other reference currency (for example, euros or dollars). The maximum sum of the card is defined according to client class. A default value in SDR is possible as a minimum. Each apparatus 2, 2', 2" or 2''' stores the SDR value (currency-specific) relevant for it, as communicated to it by the server, in the log-in process. Depending on exchange fluctuations, the POT apparatuses are automatically supplied with current exchange rates by the financial server.

A method of recharging the mobile system 1, 10 with a sum of money will now be described in detail with the aid of FIGS. 6A, 6B, and 6C. This method can likewise be applied to any of the embodiments of the invention illustrated in FIGS. 1 to 4.

A recharging process takes place with the client's mobile system 1, 10 and the POT apparatus 2 together. However, a direct recharging process from the financial server 4, 4', or 4" might also be applied. Depending upon the client class, or also according to need, the voucher card stack can be retrieved from the client by the financial server for detailed checking. After the recharging process, the stack can be deleted by the financial server.

Figure 6A:
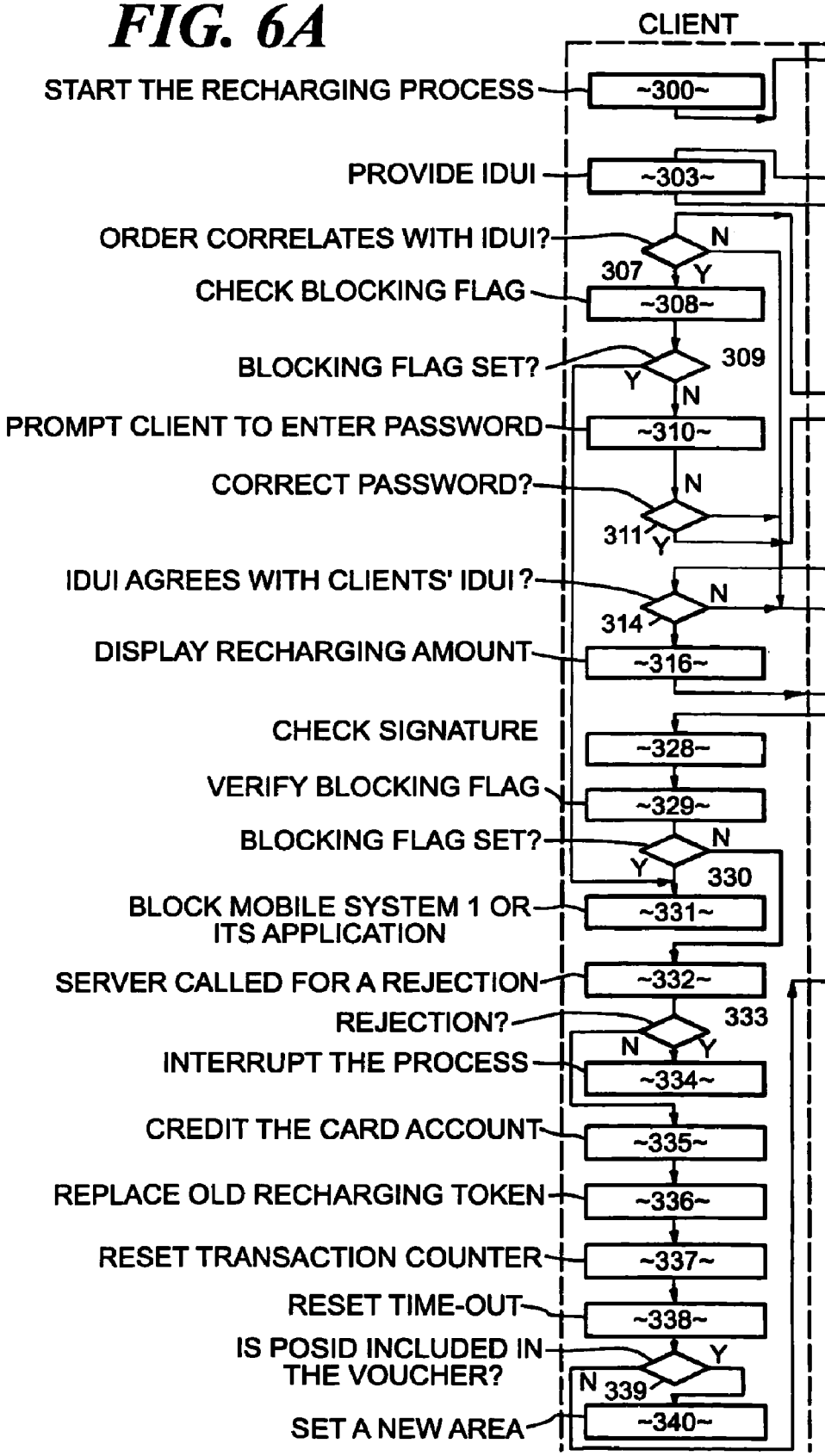

FIG. 6A shows the process steps involving chiefly the mobile system 1; FIG. 6B describes the process steps carried out by the POT apparatus 2; FIG. 6C describes the operations of the financial server 4 the effects upon the various accounts at the financial institution. It must be noted, however, that many process steps may )e carried out either with the mobile system 1, for example, within the SIM card 10, or with the POT apparatus 2. For example, the process steps relating to the data input may take place either on the POT apparatus or on the mobile apparatus 1 if the mobile apparatus has a keypad, such as a GSM mobile apparatus. If the mobile apparatus 1 and the POT apparatus 2 are not wire connected, the communication between the two parts is preferably coded, for example, by means of a DEA, DES, TDES, RSA, or ECC security algorithm.

Figure 6B:
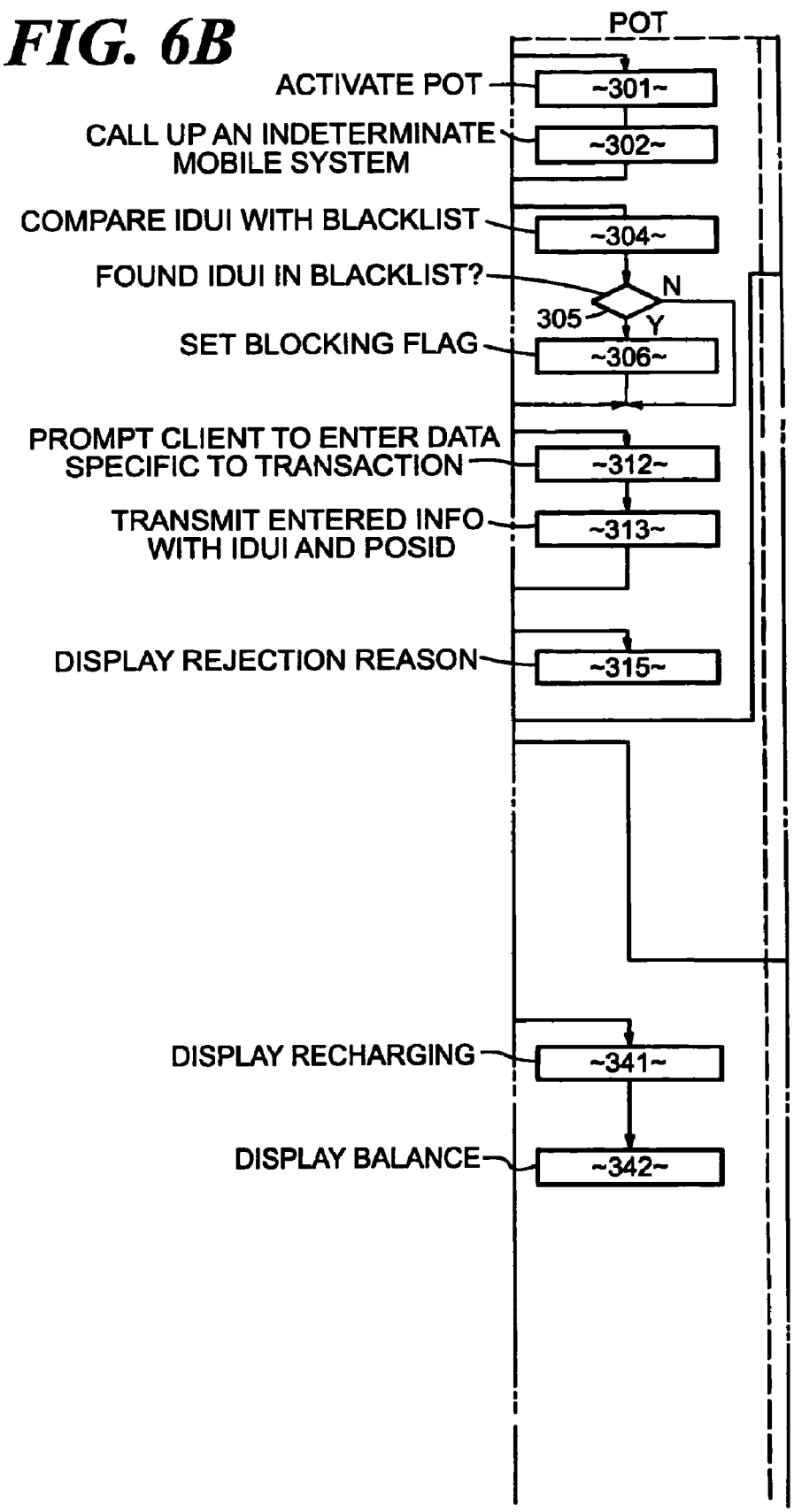
Figure 6C:
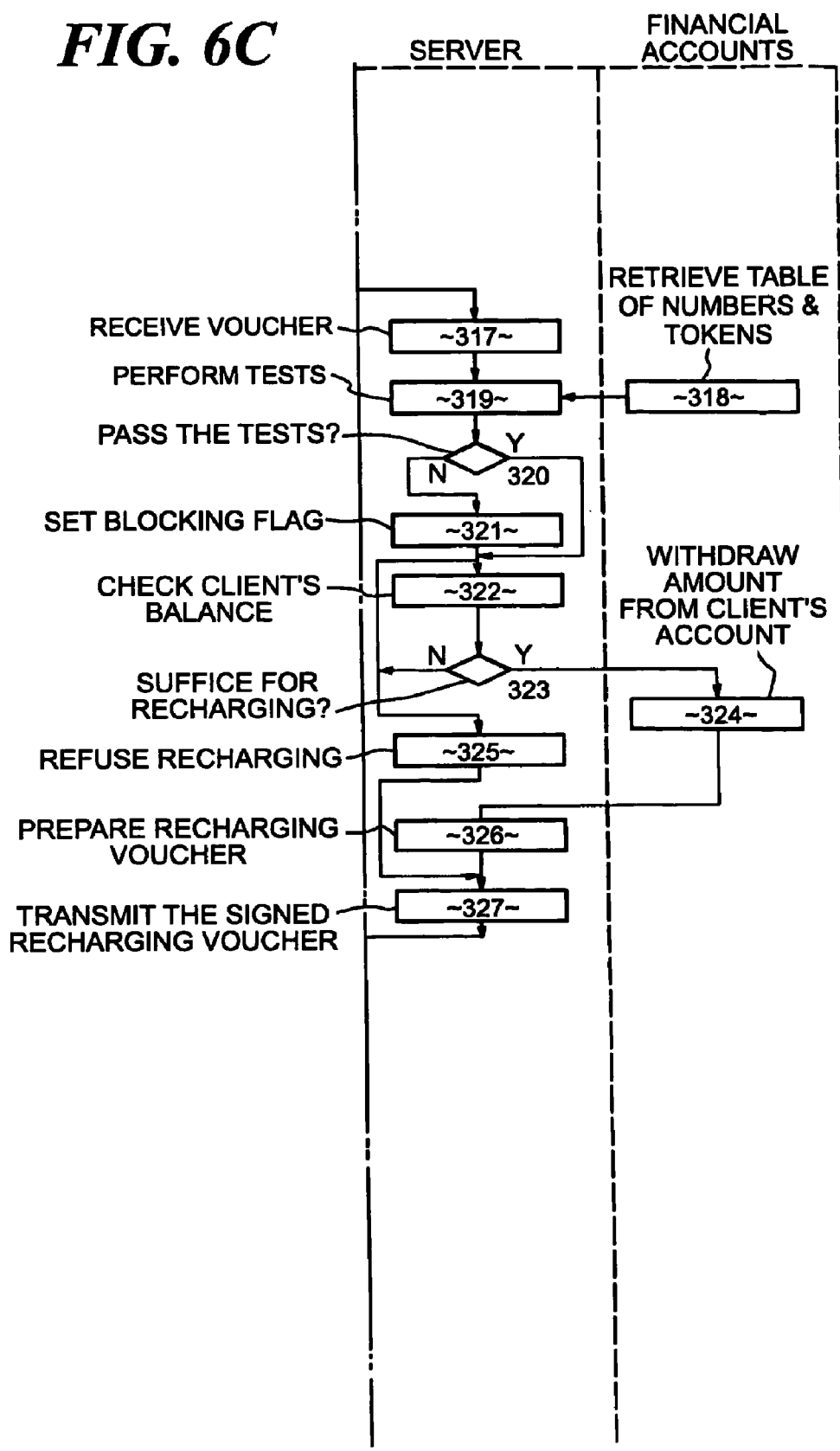

In FIG. 6A, at step 300, the mobile system 1, 10, for example, the identification card 10, is first operatively released for the recharging process; the POT apparatus 2 is also activated in turn in step 301 in FIG. 6B. The POT apparatus 2 then calls up in step 302 in a broadcast process the next, indeterminate mobile system 1, 10 ("card paging").

When the connection between the POT apparatus 2 and the mobile system 1, 10 has been established, the client supplies the POT in step 303 in FIG. 6A with his IDUI (international debit user identification) and the type of process to be started, here recharging.

In FIG. 6B, the POT apparatus 2 contains a blacklist, preferably updated periodically by the financial server 4, of mobile systems to be barred (revocation list). The IDUI transmitted by the client is compared with the blacklist (step 304). If the IDUI furnished by the client is found on the blacklist (step 305), a blocking flag is set in step 306. Thereafter, or if no entry is found, it is checked in FIG. 6A in step 307 whether the order correlates with the IDUI. If not, the reason for rejection is displayed on the POT apparatus 2 (step 315 in FIG. 6B). Otherwise, the blocking flag is checked in step 308 in FIG. 6A. If it is set, the mobile system 1, or at least the respective application in the identification card 10, is blocked (step 331). If it is not set, the client is prompted in step 310 to enter his user password manually on the mobile apparatus 1. If the password entered is not correct (step 311), the blocking flag is likewise set and the reason for rejection displayed on the POT apparatus 2 (step 315) (FIG. 6B); otherwise, the process is free for recharging, and the client is prompted in step 312 to enter the data specific to the transaction, here a recharging amount A. In the modification illustrated, the recharging amount may be entered on the POT apparatus; this amount is linked in step 313 with the POSID and the IDUI, signed, and transmitted to the card 10. However, the amount A might also be entered on the mobile apparatus 1; in that case, no POT is involved, hence the POSID is not needed.

In FIG. 6A, it is checked in step 314 whether the IDUI in the data received by the POT apparatus 2 agrees with the client's own IDUI. If not, the reason for rejection is displayed on the POT apparatus 2 (step 315 FIG. 6B); otherwise, the desired recharging amount entered on the POT apparatus is displayed on the screen of the mobile apparatus. In step 316 (FIG. 6A), the POSID, the IDUI, the already mentioned number of payment transactions Tc, the number of recharging processes carried out as stored on the card ($CT_c$, client charging token), and the sum remaining on the card (debit rest amount, DRA) are linked, signed, encoded, and then optionally compressed. A recharging voucher is thereby created. Optionally, the voucher stack on the card may also be transmitted, for example, according to client class, upon card issuance, or as necessary during use in case of solvency problems. The POSID is now integrated in the recharging voucher if the client has a mobile apparatus without the POT input part so that he can also be addressed by the financial server. The recharging voucher is then transmitted to the financial server 4, 4', or 4", where the TTP server 40, in step 317 (FIG. 6C), receives this voucher, decodes and decompresses it, if need be, and verifies the signature of the client and, as the case may be, of the POT.

With the aid of the table 318, which stores the number of tokens with respect to the processes between the client and the financial server, the following tests are carried out in step 319:

Test of amounts: the sum, $\Sigma A$, of all amounts credited to the card, including the starting sum, must be equal to or less than the sum of all check debits $\Sigma CD$, and of the remainder DRA on the card. The sum may be less because the vouchers still underway between the mobile system 1, 10, the clearing unit 3, and the financial server 4, 4' or 4" cannot yet be included at this moment.

Charging-token test: the number of charging and recharging transactions is counted in the mobile system, for example, by means of a token, $CT_C$, in the SIM card and by means of another token, $CT_S$, in the financial server 4, 4' or 4". These two tokens must be equal.

If the client's account (or credit limit) at the financial institution 4 suffices for the amount to be recharged (steps 322, 323), this amount is withdrawn from the client's account 41 (324), including any commissions. A recharging voucher is then prepared in step 326 from the POSID, the IDUI, the amount A, the new charging token CTn, and a predefined time-out increment TOi. In step 327 this recharging voucher is signed, optionally encoded and compressed, and transmitted to the client's mobile system 1, 10. During step 328 in FIG. 6A, the latter checks whether the signature in the voucher comes from the financial server and verifies during step whether the blocking flag is set. If so (step 330), the mobile system 1, or at least the respective application, is blocked in step 331. Otherwise, it is checked whether the financial server has called for a rejection (step 332), which leads to interruption of the process with an indication of the reason for rejection (step 334).

If one of these three conditions is not fulfilled (step 320), the blocking flag is set in step 321 and the recharging process refused in step 325. Otherwise, the balance of the client's account 41 is checked in step 322. If it does not suffice for recharging (step 323), the refusal is likewise prepared in step 325.

If the client's account (or credit limit) at the financial institution server 4, 4' or 4" suffices for the amount to be recharged (steps 322 and 323), this amount is withdrawn from the client's account 41 (step 324), including any commissions. A recharging voucher is then prepared in step 326 from the POSID, the IDUI, the amount, A, the new charging token CTn, and a predefined time-out increment TOi. In step 327, this recharging voucher is signed, optionally encoded and compressed and transmitted to the client's mobile system 1, 10. During step 328, the mobile system 1, 10 checks whether the signature in the voucher comes from the financial server and verifies during step 329 whether the blocking flag is set. If so (step 330), the mobile system 1, or at least the respective application, is blocked in step 331. Otherwise, it is checked whether the financial server has called for a rejection (steps 332 and 333), which leads to interruption of the process with an indication of the reason for rejection (step 334).

If all tests have been successfully passed, the card account is credited in step 335 with the recharging amount called for. The old charging token CTc is then replaced by the new charging token CTn transmitted by the financial server (step 336), the transaction counter Tc on the card is reset in the next step, 337, and the time-out TOi is reset in step 338. If it is found in step 339 that the POSID is contained in the recharging voucher, a new area is further set in step 340.

The recharging amount is then displayed by way of confirmation, either on the screen of the mobile apparatus or on the POT apparatus (step 341) (FIG. 6B). Finally, the total balance of the account is also displayed on the card (step 342).

Security of the data transfers by cryptography is differently undertaken in two discrete segments. Between the client and the POT, the communication through the air interface is safeguarded by, for example, an algorithm such as DES, TDES, RSA, or ECC. Between the client and the financial server, on the other hand, the TTP (trusted third-party) method, or optionally, a PTP (point-to-point) method, is used. The necessary elements are integrated on the identification element 10 and in the TTP server 40. A description of the TTP concept is appended.

Figure 7:
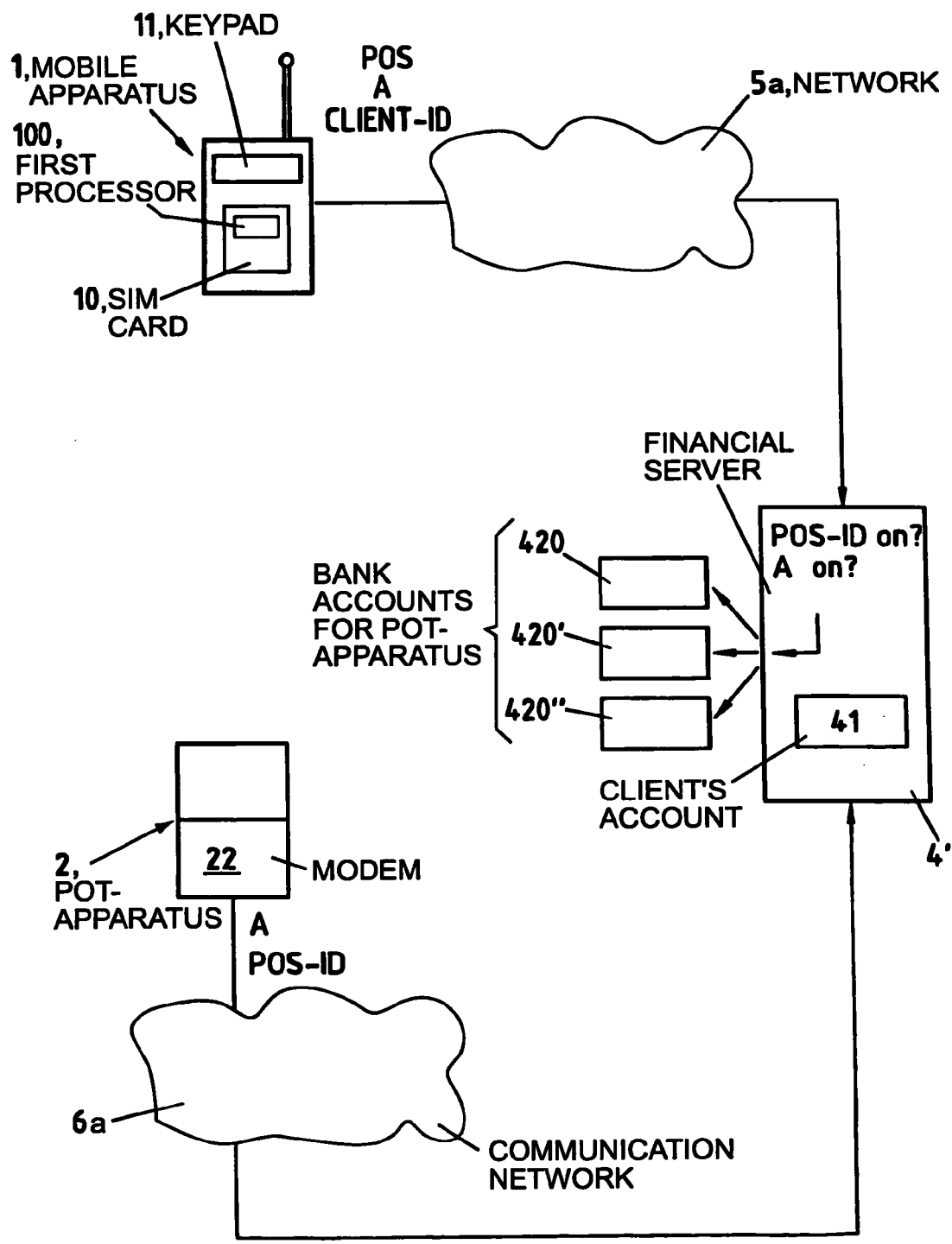
FIG. 7 shows a block diagram showing the information flow in a further possible embodiment of the invention.

The information flow in a fifth embodiment of the inventive transaction method will be explained below with the aid of FIG. 7. The client is equipped with a mobile apparatus 1 which likewise contains a SIM card 10 identifying him in the GSM network 5a. The seller needs a POT apparatus 2 having a modem connection 22 to a telecommunication network 6a, for example, a fixed network. Both have a contract with the operator, for example, a financial institution, of the financial server 4'.

In order for the transaction between client and seller to take place, the seller must first key in on the POT 2 the amount A to be paid. The POT apparatus 2 links this amount A with a POSID stored in the POT, which identifies the branch and the cash desk in this branch. These linked data are transmitted to the financial server 4' over the preferably secured data network 6a.

The client prepares on his apparatus 1 a special short message, preferably an SMS message, or possibly a USSD file, containing the amount, A, to be paid and the POSID communicated verbally by the seller, and sends this short message via the GSM network 5a and the short message service center (SMSC, not shown) to the financial server 4'. This short message automatically contains the client identification stored in the SIM card 10. In a preferred embodiment the short message further comprises a requested PIN code. The short message may be encoded prior to transmission.

Preferably, no indications concerning the service, product, or information purchased are transmitted in order to protect the buyer's privacy.

The financial server 4' receives the data from the POT apparatus 2 and from the client's mobile system 1 and supplements them, if necessary. It knows the POSID identity and the amount, A, from the POT. Hence it can determine the POT account 420, 420' or 420" to be credited. The financial server 4' knows the identify of the client by means of client identification and, if need be, the PIN and the amount. Hence, it can determine the client's account 41 to be debited. The financial server 4' then compares the POSID transmitted by the POT apparatus 2 and by the mobile system, as well as the amount. If they agree, the transaction takes place between the POT account and the client's account. The financial server 4' then sends a message to the POT apparatus 2 and/or to the mobile apparatus 1 that the transaction has taken place, and this message is displayed. In the event of discrepancy, the operation is cancelled.

Figure 8:
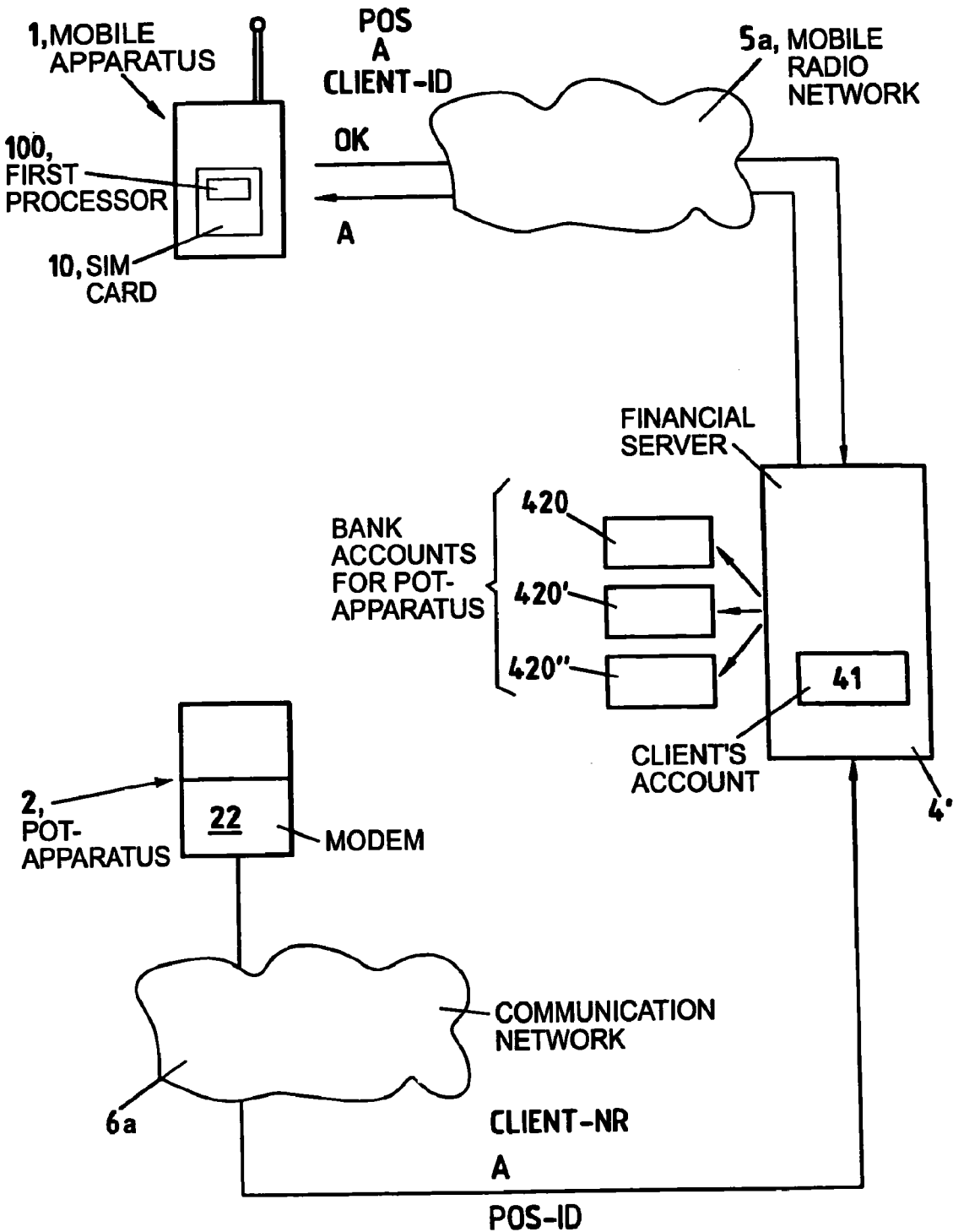
FIG. 8 shows a block diagram showing the information flow in a further possible embodiment of the invention.

The information flow in a further possible embodiment of the transaction method will be explained below with the aid of FIG. 8. The client is equipped with a mobile apparatus 1 which likewise contains a SIM card 10 identifying him in the mobile radio network 5a. The seller needs a POT apparatus 2 having a modem connection 22 to a telecommunication network 6a, for example, a fixed network. Both have a contract with the operator, for example, a financial institution, of the financial server 4'.

In order for the transaction between client and seller to take place, the operator of the POT apparatus 2, for example, a salesperson, must enter on the POT apparatus 2 the amount, A, to be paid and the client's mobile telephone number. The POT apparatus 2 links these particulars with a POSID stored in the POT, which identifies the branch and the cash desk in this branch. These linked data are transmitted to the financial server 4' over the preferably protected data network 6a. Preferably, no information concerning the product purchase is transmitted in order to guarantee the buyer's anonymity.

The financial server 4' receives the data from the POT and supplements it, if necessary. It knows the identity POSID of the POT and the amount A. Hence, it can determine the POT account 420, 420' or 420" to be credited. Likewise, it can identify the client by the mobile telephone number transmitted and therefore knows the client's account 41 to be debited.

The financial server 4' then sends the client a special short message, for example, an SMS or USSD short message, containing the amount A. The client must then confirm the transaction by means of a confirmation short message containing an identification of the client in the GSM network. If no confirmation comes from the client, or if the identification transmitted does not agree with the client's mobile telephone number, the operation is cancelled. Otherwise the transaction takes place.

Figure 9:
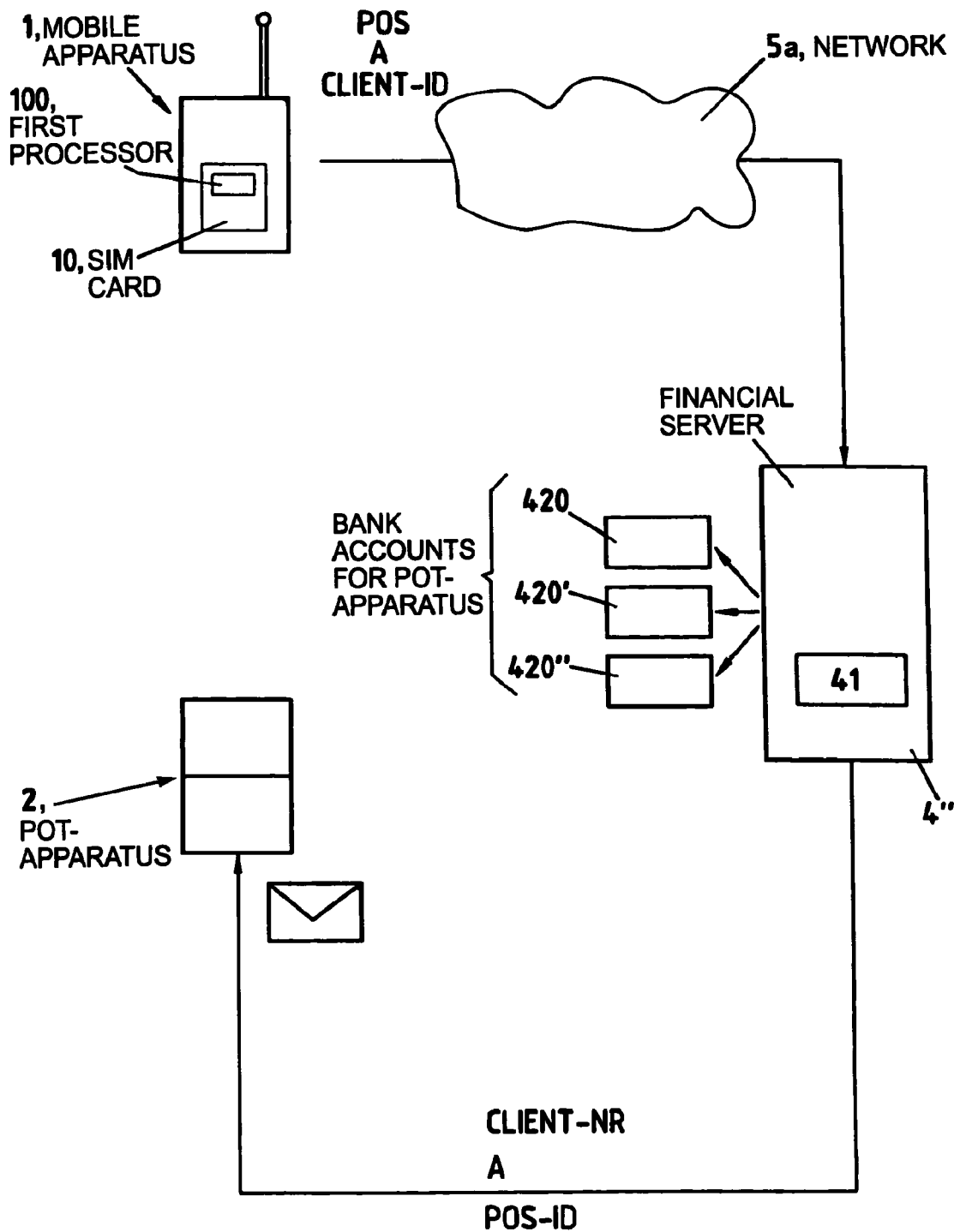
FIG. 9 shows a flow chart of a possible recharging transaction method with a Subscriber Identity Module (SIM) card.
Figure 12:
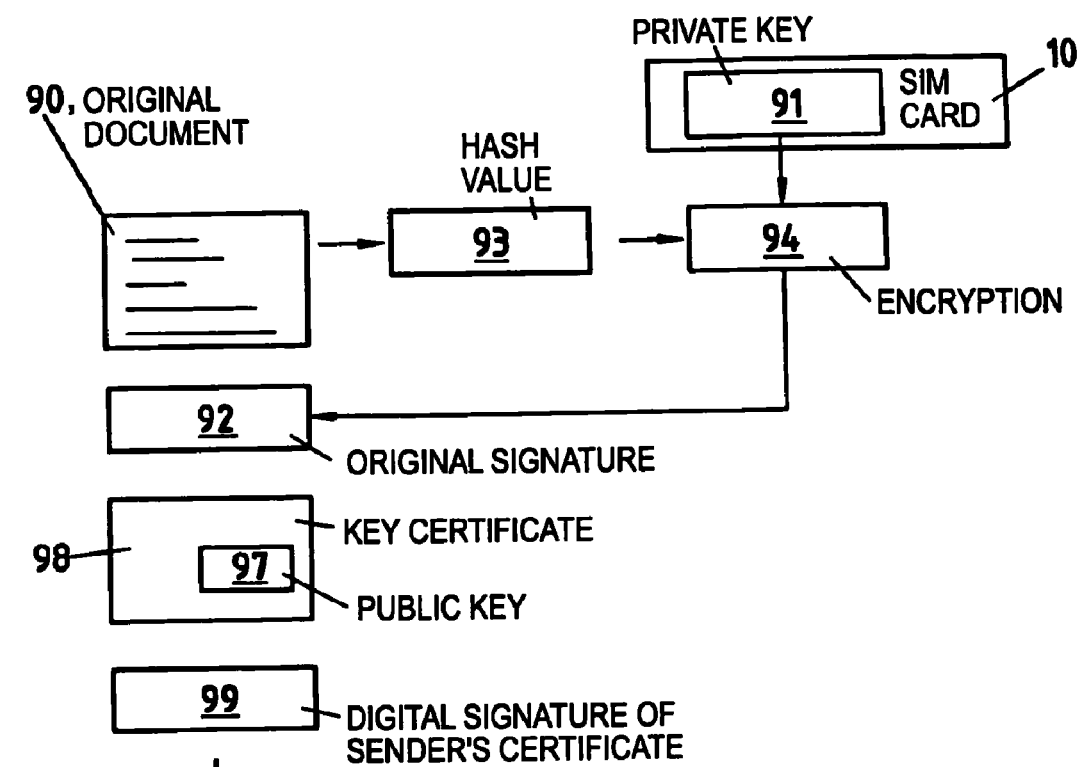
FIG. 12 shows a block diagram explaining the signing and verification of the signature.
Figure 12:
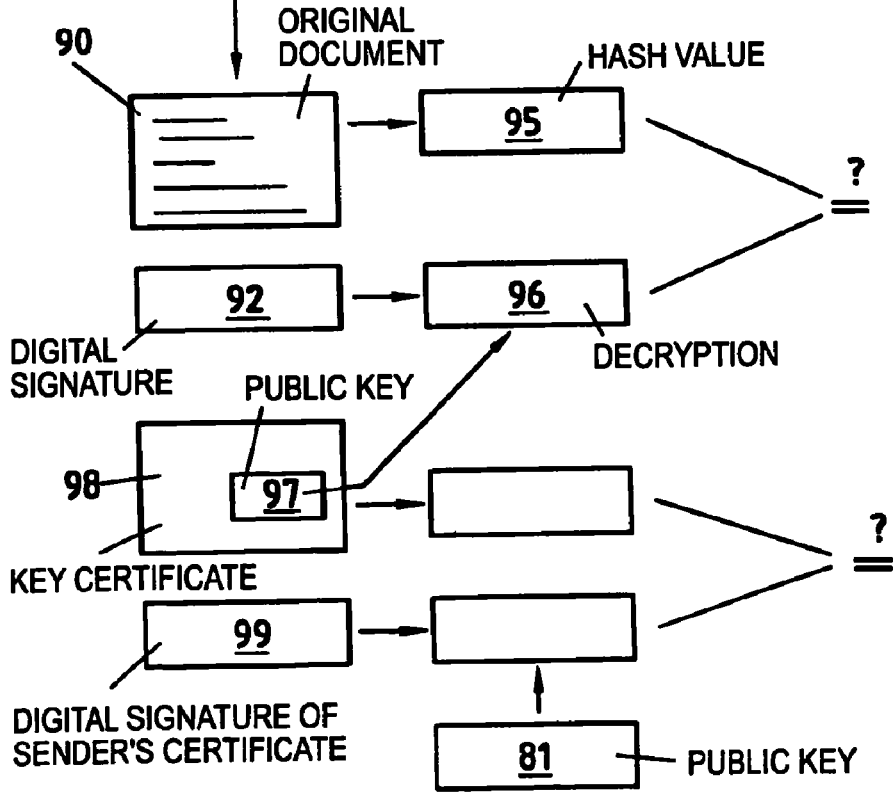

The information flow in a seventh embodiment of the inventive transaction method will be explained below with the aid of FIG. 9. The client is equipped with a mobile apparatus 1 which likewise contains a SIM card 10 identifying him in the GSM network 5a. The seller requires a normal POT apparatus 2 which needs no telecommunication connection.

Both have a contract with the operator, for example, a financial institution, of the financial server 4'.

In order for the transaction between client and seller to take place, the client must prepare a special short message, for example, an SMS or USSD short message, containing the amount, A, to be paid and the POSID, communicated by the seller. The client must send this short message via the GSM network 5a and the SIM center (not shown) to the financial server 4'. This short message automatically contains the client identification stored in the SIM card 10. It preferably further contains a requested security PIN code. Preferably, no information concerning the purchased product is transmitted in order to protect the buyer's privacy.

The financial server 4' receives the data from the client and supplements it, if necessary. It knows the identity POSID of the POT apparatus 2 and the amount A. Hence, it can determine the POT account 420, 420' or 420" to be credited. Likewise, it can identify the client through the client identification in the short message and therefore knows the client's account 41 to be debited.

The financial server 4' effects the transaction and sends the POT operator a confirmation in the form of a short message, an E-mail message, or a normal letter by post. This communication contains at least the identification of the POT, the date, the time, the amount, and possibly the client's account.

Preferably, all vouchers are transmitted between mobile apparatus, POT apparatus, and the financial servers as SMS or USSD messages. If SMS short messages are used, they are preferably provided with a special header in the data telegram in order to distinguish them from ordinary messages. In addition, the content of these messages is preferably encoded by means of the TTP method described in the appendix and illustrated by FIGS. 10 to 13.

Those skilled in the art will understand that the invention is also suitable for non-financial transactions between a mobile system and a POT apparatus 2 connected to a telecommunication network 5 or 5a. For example, the POT apparatus 2 may also take the form of a locking device. For this application, the mobile system 10, for example, in the form of a chip card, has an electronic code loaded; the code is reloaded from the server 4, 4' or 4" and stored on the card 10. In order to open the locking device, a contact-free communication is established between the mobile system 10 and the POT apparatus 2, for example, through an inductive or possibly infrared interface. The locking device is opened only when, after this communication, the code stored in the mobile system 10 proves to be correct and gives its owner the right to enter the protected zone. The server 4, 4' or 4", to which the locking device is connected over the network 5 or 5a, administers and registers the admission permits and, if need be, debits the client's account 41 for an amount dependent upon the admissions which take place.

Appendix—Basic Principles of Cryptography and TTPs

Security Requirements

In the exchange of data between the mobile system 1, 10 and the financial server 4, 4' or 4", a distinction is made among the following requirements for security:
confidentiality: guarantee that information is not made accessible or legible to unauthorized parties.
authentication: process in which authenticity is checked.
authenticity: proof of identity. It provides the certainty that the client, the POT apparatus 2, or the server 4, 4' or 4" really is the one it claims to be.
authenticity of information: certainty that the sender or producer of information (mobile system 1, 10, POT apparatus 2, 2', 2" or 2''', or financial server 4, 4' or 4") is authentic.
undeniability of origin—proof of origin: the sender of information cannot deny that the information comes from him.
integrity: guarantee of the consistency of the information, i.e., protection against alteration, addition, or deletion of information.

Hereafter the term "message" is used instead of the term "information." A message is information (here a bit sequence) transmitted from a sender to a recipient. For this application, a message may, for example, be a payment voucher or a recharging voucher. The terms "sender" and "recipient" mean, depending upon the direction of the message, either the mobile system 1, 10, the POT apparatus 2, 2', 2" or 2''' or the financial server 4, 4' or 4".

The authenticity of the sender, integrity of the information, and undeniability of the origin of the information are achieved through the use of a so-called digital signature. A digital signature is a cryptographic key or code (i.e., a bit sequence) unique to certain information. A cryptographic key (also a bit sequence) held only by the author is required for its production. Consequently, the digital signature can be produced only by the holder of the private key. It is normally added to the original message.

The confidentiality of the information transmitted is achieved by encoding. This consists of transforming the message into an illegible condition with the aid of an encoding algorithm and a cryptographic key or code (bit sequence). The original information cannot be recovered from the message thus transformed unless the key necessary for decoding is known.

How this functions in detail is explained below.

Symmetrical and Asymmetrical Encoding

A distinction is made between two kinds of encoding algorithms:
symmetrical: the same cryptographic key is used for encryption and decryption (encryption—encoding) of information. Accordingly, the sender and the recipient must be in possession of the same key. Without this key it is impossible to get the original information back again. The symmetrical algorithm used most frequently today is DES (digital encryption standard). Other algorithms are, for example, IDEA (international data encryption algorithm), RC2, and RC4 (Rivest's Cipher 4). Symmetrical algorithms are preferably utilized for protecting data transfers between mobile systems and POT apparatuses. The key is then stored in the POT apparatus 2 and in the mobile system 10.
asymmetrical: two different, complementary keys (key pair) are used for encryption and decryption; this means that the message is encrypted by means of a first key and decrypted by means of a second key. This procedure is reversible, i.e., the second key can also be used for encryption and the first key for decryption. It is impossible to reconstruct the second key on the basis of the first key (and vice versa). It is equally impossible to calculate the key based upon the encrypted information (this is true even if the original information is known). By far, the most widely used asymmetrical algorithm is RSA (named after its inventors, Rivest, Shamir and Adleman). A variant of it is DSS (digital signature standard).

With the aid of asymmetrical encryption, a so-called digital signature can be produced. How that functions in detail is explained below.

Private and Public Keys

With the aid of the asymmetrical encoding technology, a so-called system of public and private keys can be created. Here, one key of the complementary key pair is called private. It is held by the sender, for example, the client, and is known only to him. It is therefore also called the secret key (though this term is normally used for symmetrical keys). The other key is the public key. It is accessible to all. As mentioned above, it is not possible to calculate the private key on the basis of the public key. Each mobile system, POT apparatus, and financial server receives from a trustworthy source a key pair consisting of a private key and a public key.

It is of the greatest importance that the private key really does remain secret, i.e., that it is not known to anyone else, as it forms the basis for the security of the digital signature. For this reason, the private key is stored only in encoded form on the identification card 10, on which, moreover, the encryption algorithm is directly implemented. In this way, the private key always remains in the chip and does not leave it at any moment. The data to be encoded are transferred to the chip, are encoded there, and are subsequently returned. The architecture of the chip is such that the private key cannot be read by electronic means, or by optical, mechanical, chemical, or electromagnetic means.

Contrary to the private key, the public key is generally known and is distributed to all users. For the sake of simplicity, the public key is usually sent along with each message. As will be seen below, a trustworthy authority (certification authority) is needed to guarantee the authenticity of the public key since a criminal could produce his own key pair and pretend to be someone else. This guarantee of authenticity takes the form of a so-called certificate, which will be described in detail below.

The Hash Function

The hash function is a non-reciprocal algorithm which produces a hash value (abridgment, compressed version) of fixed length. It is comparable to the sum of the digits of a whole number. Here the length of the message is typically somewhat greater than the hash value calculated from it. Thus, for example, the message may comprise several megabytes, whereas the hash value is only 128 bits long. It is to be heeded that the original information cannot be deduced on the basis of the hash value (non-reciprocity) and that it is extremely difficult to alter the information in such a way that it yields the same hash value. The purpose of such a function is the production of a short code unique to the respective document. This code is used for producing the digital signature. Examples of hash algorithms are MD4 (message digest 4), MD5, RIPE-MD, and SHA (secure hash algorithm).

The Digital (Electronic Signature)

This method is described with reference to FIG. 10. Every user receives a private key and a public key. In order to sign a message 90 digitally, it is encrypted with the sender's private key (block 94). The result is the digital signature 92. However, since the signature thus created would be the same size as the original message, the has value 93 of the message 90 is first calculated. As mentioned above, the hash value has a fixed length and is unique to a specific message. For forming the digital signature, the hash value 93 is now encrypted instead of the original message. The digital signature 92 thus created is added to the original document 90. The whole thing is then sent to the recipient (FIG. 10).

Since only the sender of the document possesses his private key 91, only he can produce the digital signature. It is here, too, that the analogy to a handwritten signature then resides. The digital signature has certain characteristics, however, which are not present in a handwritten signature. Thus, for example, it cannot be ruled out in the case of a contract signed by hand that information has been added or deleted unnoticed, which is not possible with a digital signature. Hence, the digital signature offers even better security than the traditional handwritten signature.

Checking the Digital Signature

Since the public key 97 is distributed to all users and is thus generally known, every recipient can check the digital signature 92. To do this, he decrypts the digital signature 92 by means of the sender's public key 97 (block 96 in FIG. 11). The result is the hash value of the original message 90. Parallel to this, the recipient calculates the hash value 95 of the original document 90 which has also been transmitted to him (together with the signature 92). The recipient now compares the resulting second hash value 95 with the hash value 96 decrypted from the signature. If the two hash values agree, the digital signature is authentic.

If the original message 90 was altered during transmission (one bit is enough), its hash value 95 will change as well. Thus, the recipient would find that the hash value 95 he has calculated on the basis of the original message does not agree with the hash value 96 decrypted from the signature, meaning that the signature is not correct. Consequently, with a successful verification of the digital signature, the recipient has the guarantee that the message 90 has not been altered (integrity).

Since only the producer of a signature is in possession of his private key 91, only he can produce the digital signature 92. This means that the recipient who has the digital signature 92 can prove that only the sender could produce the signature (undeniability of the information origin).

Certification of the Public Key

The digital signature 92 thus makes possible the undeniability of the origin and the guarantee of integrity of a message 90. Now, however, there still remains one security problem, viz., the guarantee of authenticity of the sender's public key 97. For until now, the recipient has no guarantee that the public key 97 actually is that of the sender. Although the signature may be valid, the public key 97 associated therewith might theoretically be fraudulent.

Hence the recipient of a message 90 needs to be certain that the sender's public key 97, which he holds, really belongs to the proper sender. He can achieve such certainty in various ways. One possibility is that the sender gave him the public key 97 in person at some time. Or the recipient calls the sender and compares, say, the first 10 places of the public key. However, these methods are troublesome and require that the users either already know each other or have previously met.

It would be better if there were an authority which guarantees that a public key belongs to a certain person. This authority is called a certification authority (CA) and guarantees that a specific public key 97 belongs to a specific person. It does so by producing a so-called certificate 98 of the public key 97 (FIG. 12), consisting essentially of the public key and the name of the holder. The whole thing is then signed by the certification authority (signature 98). By means of the certification, the CA therefore ties a public key 97 to a specific sender (client, POT, or server). For all users, a certificate of the public key is issued in this way by the CA. These certificates are accessible to all users.

By checking the digital signature 99 of the sender's certificate as well as the signature 92 of the message itself, the recipient has proof that the message 90 was signed by the person he claims to be (authentication).

It should be noted that the key certificates 98 need not be specially protected since they cannot be forged. For if the contents of the certificate have been altered, the recipient notices this because the signature 99 is no longer correct. And since no one by the CA has the CA's private key, it is not possible for anyone to forge the signature of the CA.

There are various possibilities of disseminating the key certificates 98, 99. One possibility is to send the certificates 98, 99 along with each message.

With the aid of the techniques described above, two clients, POT or servers unacquainted with each other can therefore mutually exchange information in a secure manner.

Distribution of the Public Key of the Certification Authority

There now remains one last problem. As described in the preceding chapter, the recipient of a message checks the sender's certificate. For that purpose, he needs the public key of the certification authority. Now, although the CA could certify its own public key, that would not make much sense since it is possible for anyone to generate a key pair and produce a CA certificate himself (with the respective name of the CA). Thus, there is no actual certificate for the public key of the CA. This fact theoretically allows a criminal to pose as the certification authority and thus to produce and distribute false key pairs and certificates. For this reason, the public key of the certification authority must reach the user through a secure channel. The user must be convinced he holds the correct key of the CA.

One solution which immediately presents itself is to store the public key of the certification authority in the user's SIM card. Although that key can be read (unlike the user's private key), it cannot be overwritten or deleted. This is achieved by means of the special architecture of the chip 101.

Transmitting a Digitally Signed Message Without Encryption: Summary

By means of his private key 91 stored on the card 10, the sender signs the message 90 in order to confirm its origin.

The original message 90, together with the signature 92 and the signed certificate 98, 99 of the sender, is sent to the recipient (arrow 80).

The recipient checks the digital signature 92 of the document 90 with the aid of the sender's public key 97 sent along in the sender's certificate 98.

In addition, he assures himself of the authenticity of the sender's public key 97 by checking the digital signature 99 of the certificate. He uses, for this purpose, the public key 81 of the certifying authority.

Encryption of the Message

In order to ensure the confidentiality of a transmission, i.e., to protect it from inspection by unauthorized parties, the message must be encoded (encrypted). There are theoretically two possibilities of doing this. The message might be encoded by means of the recipient's public key. Since only the recipient is in possession of the associated private key, consequently only he can decode the message. The fact is, however, that the asymmetrical encryption algorithms are very slow as compared with the symmetrical ones.

Figure 13:
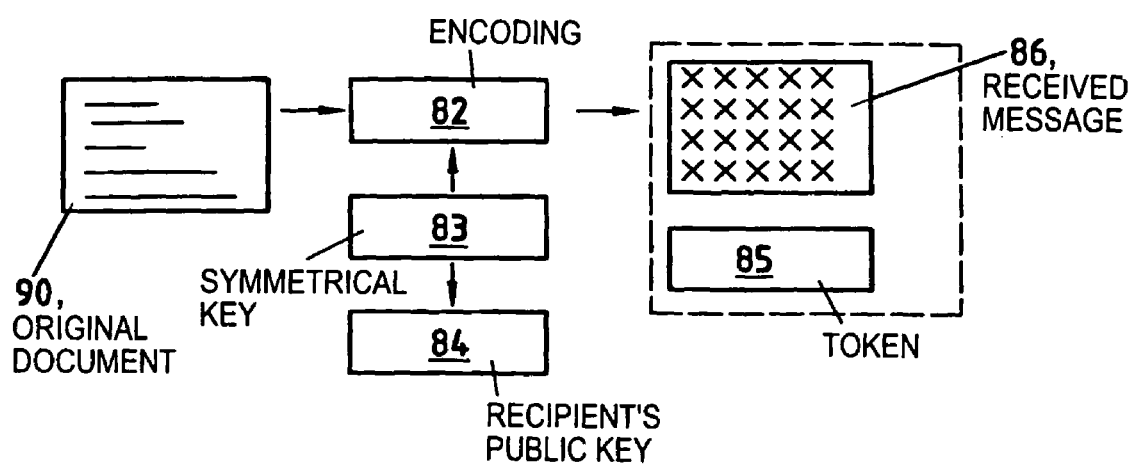
FIG. 13 shows a block diagram explaining the encoding of the messages.

Therefore, a symmetrical algorithm is preferably used for encryption of the message (FIG. 13). The sender of a message 90 generates a symmetrical key 83, with the aid of which he encodes the message 90. This symmetrical encoding takes only a fraction of the time Which would be needed if an asymmetrical algorithm were used. The recipient musts know the same symmetrical key. It must therefore be transmitted to him, itself encoded since otherwise a swindler might also read the key 83 during transmission and could decode the received message 86. For this reason, the symmetrical key 83, the so-called session key, is encoded by means of the recipient's public key 84. The encoded session key thus created is also called a token 85. The token 85 therefore contains the symmetrical key 83 used for encryption of the message 90, encoded by means of the recipient's public (asymmetrical) key 84. The token 85 is transmitted together with the encoded message 86, the signature 92, and the certificate 98, 99.

The recipient decodes the token 85 by means of his private key. He thus obtains the symmetrical key 83 needed for decoding the message. Since only he has the private key, only he can decrypt the message.

Transmission of a Digitally Signed Message with Encryption: Summary

Sender:

The sender signs the message 90 by means of his private key 91.

He then encodes the message 90 by means of a symmetrical key 83 generated by him.

Next, he encodes this symmetrical key by means of the recipient's public key 84. This creates the token 85.

The original message 90 is then sent to the recipient together with the signature 92, the token 85, and the signed certificate 98, 99.

Recipient:

The recipient first decodes the token 85 by means of his private key.

By means of the symmetrical key 83 thereby recovered, he decodes the message 90.

He now checks the digital signature 92 of the message 90 with the aid of the public key 97 contained in the sender's certificate 98.

Moreover, he assures himself of the authenticity of the sender's public key 97 by checking the digital signature 99 of the certificate 98 by the certification authority. For this purpose, he uses the public key 81 of the certification authority.

Revocation List—Invalidation of Certificates

Let us assume that a client's SIM card, containing his private key 91, is stolen form him. The thief can now use this private key and pose as the victim of the theft, without this being noticed by the recipient. Hence there is need for a mechanism for informing all users that the certificate belonging to the stolen private key 91 is no longer valid. This is done by means of a so-called list of invalid certificates, the above-mentioned certificate revocation list (CRL). It is digitally signed by the CA and published, i.e., it is made accessible to all POTs and servers. Therefore, every recipient of a message from a client, besides verifying the sender's signature and certificate, must now check whether the latter is to be found on the revocation list, i.e., whether it is invalid.

So that the revocation list may not grow too long, only the serial number and the date on which the certificate was invalidated are inserted rather than the whole certificate. The list therefore consists of serial numbers and invalidation dates, digitally signed at the end by the CA. Also given are the date of publication of the list and the name of the CA.

The Trust Center and Trusted Third-party Services

As shown above, in an open and widespread system of many users in which two users having no joint confidential relationship want to communicate safely with one another, there is need for a third entity which places certain security services at the disposal of such users, otherwise, the time and trouble of exchanging and administering the necessary keys becomes too great for the users. This entity is called a trust center or trusted third party (TTP), and the services it offers are called TTP services. The CA, for instance, is such a service. The TTP takes over the tasks of key administration for the users and therefore enjoys their confidence. The purpose of the TTP services is therefore to safeguard various applications and protocols.

The components of a trusted third party are:

registration authority (RA): it identifies the users, receives their data, and forwards them to the certifying authority. Identification of the users is necessary since the CA guarantees that a specific public key belongs to a specific person. For that purpose, however, this person must first identify himself.

certification authority (CA): it produces the key certificates and revocation lists. These are then filed in a directory for publication or sent directly to the user.

key-generating service: it generates the keys for the users. The private key is furnished to the user via a secure channel, the public key is sent to the CA for certification.

key-personalization service: it files the private keys in a module (for example, a chop card) to protect them against unauthorized access.

key-deposit service (key escrow): it stores a copy of the key used (for return in case of loss or for "tapping" by the police on grounds of national security or combating crime).

file service: it files the key certificates (as a long-term guarantee of digital signature verification).

directory service: it makes key certificates and revocation lists available to the users.

notarial services for
1. proof of sending and receipt
2. time stamp
3. attestation of correctness of contents (analogous to existing notarial services)

The procedures described above often state that "the recipient checks the signature" or "the sender encodes the message." Naturally, the user normally need not explicitly carry out all these functions himself, but rather the mobile system 1, 10 or the financial server 4, 4' or 4" does it for him automatically.

The invention claimed is:

1. A transaction method between a client and a point-of-transaction (POT) apparatus, wherein said POT-apparatus is connected to a server via a telecommunication network, said method comprising:

receiving, in the POT-apparatus, client data read from a memory of a portable identification element of the client, the identification element containing at least one processor configured for transmitting data via a contact-free interface and not through said telecommunication network to said POT-apparatus;

linking, in the POT-apparatus, the client data, a POT-apparatus identification (POSID) and transaction-specific data into a transaction voucher, wherein said client data comprises at least one client identification (IDUI);

transmitting a debit order from said POT-apparatus to said identification element of said client through said contact-free interface and not through said telecommunication network, said debit order including at least said transaction-specific data, the POT-apparatus identification (POSID) and said client identification (IDUI);

verifying, by said identification element of said client, that said debit order correlates with said client identification (IDUI);

upon successful verification, transmitting said transaction voucher to said server via said telecommunication network.

2. The transaction method according to claim 1, wherein said identification element is a Subscriber Identity Module (SIM) card.

3. The transaction method according to claim 1, wherein said identification element is a transponder.

4. The transaction method according to claim 3, wherein said transponder communicates with said POT-apparatus via an infrared interface.

5. The transaction method according to claim 1, wherein said identification element communicates with said POT-apparatus via an integrated coil.

6. The transaction method according to claim 1, wherein said identification element is configured such that it can cooperate functionally with an apparatus in order to send at least one of a plurality of short messages and receive at least one of a plurality of short messages using said apparatus via a mobile radio network.

7. The transaction method according to claim 6, wherein said apparatus is contained within said POT-apparatus.

8. The transaction method according to claim 6, wherein said transaction voucher is transmitted to said server through said mobile radio network.

9. The transaction method according to claim 1, wherein data transmitted between said POT-apparatus and said identification element via said contact-free interface is encoded.

10. The transaction method according to claim 1, further comprising encoding said transaction voucher.

11. The transaction method according to claim 10, wherein said transaction voucher is encoded by means of a symmetrical algorithm, said symmetrical algorithm using a session key, said session key encoded using an asymmetrical algorithm.

12. The transaction method according to claim 1, further comprising certifying said transaction voucher.

13. The transaction method according to claim 1, wherein said transaction voucher transmitted by said telecommunication network contains an electronic signature of said identification element, verifiable by said server.

14. The transaction method according to claim 1, wherein said transaction voucher transmitted by said telecommunication network contains an electronic signature of said POT-apparatus, verifiable by said server.

15. The transaction method according to claim 10, said encoding comprises:
producing a hash value from said transaction voucher,
encrypting said hash value through the use of a private key stored on said identification element, and
signing said transaction voucher with said encrypted hash value.

16. The transaction method according to claim 1, wherein said transaction voucher is transmitted to said server via a clearing unit.

17. The method of claim 16, wherein said client identification (IDUI), needed for clearing in said clearing unit, is not encoded, ensuring that said clearing unit need not decode said transaction voucher.

18. The transaction method according to claim 1, wherein said transaction-specific data are read or entered into said POT-apparatus.

19. The transaction method according to claim 6, wherein said transaction-specific data are read or entered in said mobile apparatus.

20. The transaction method according to claim 1, wherein said server stores a client blacklist so that the transaction corresponding to the transaction voucher is blocked if said client identification (IDUI) included in the transaction voucher is contained in said client blacklist.

21. The transaction method according to claim 1, wherein said server stores a POT blacklist so that the transaction corresponding to the transaction voucher is blocked if said POT-apparatus identification (POSID) included in the transaction voucher is contained in said POT blacklist.

22. The transaction method according to claim 1, wherein said POT-apparatus stores a client blacklist updated by said server so that the transaction corresponding to the transaction voucher is blocked if said client identification (IDUI) included in the transaction voucher is contained in said client blacklist.

23. The transaction method according to claim 20, wherein said client, is at least partially blocked if said client identification is contained in at least one client blacklist stored in at least one of said POT-apparatus and said server.

24. The transaction method according to claim 1, wherein said identification element contains a stack with data concerning transactions already carried out.

25. The transaction method according to claim 24, wherein,
said transaction-specific data contain an amount of money;
said server is administered by a financial institution, and
a sum of money stored on said identification element is debited during said transaction.

26. The transaction method according to claim 25, wherein said sum of money stored on said identification element can be recharged over a mobile radio network via recharging vouchers from said server.

27. The transaction method according to claim 25, wherein said sum of money is defined according to a standard currency.

28. The transaction method according to claim 1, wherein said transaction-specific data from said POT-apparatus is transmitted to said server via a different contact-free interface than the contact-free interface used to exchange data between said POT-apparatus and said identification element.

29. The transaction method according to claim 7, wherein at least certain data from said server is transmitted by a mobile radio network to said apparatus portion of said POT-apparatus, said POT-apparatus relaying said certain data to said identification element, said identification element being a transponder.

30. An identification element for transacting with a point-of-transaction (POT) apparatus, wherein said POT-apparatus is connected to a server via a telecommunication network, said identification element comprising:
at least one processor having a memory area in which a client identification (IDUI) is stored;
an electronic signing mechanism configured to provide transaction vouchers, containing at least said client identification (IDUI), with an electronic signature;
a contact-free interface for relaying said signed transaction vouchers to a POT-apparatus; and
an accepting mechanism configured to accept a debit order from said POT-apparatus through said contact-free interface for verifying whether said debit order correlates with said client identification (DUI), said debit order comprising:
said client identification (IDUI),
a POT-apparatus identification (POSID), and
transaction-specific data.

31. The identification element of claim 30, further comprising a solvency checker configured to compare a sum of money to be paid, in said transaction-specific data, with a sum of money stored in said identification element.

32. The identification element of claim 31, wherein said signing mechanism comprises:
a private key stored in said memory,
a hash value producing mechanism configured to produce a hash value from an uncoded transaction voucher,
a mechanism configured to,
encrypt said hash value using said private key, and
sign the uncoded transaction voucher with said encrypted hash value of the uncoded transaction voucher.

33. The identification element of claim 30, further comprising an integrated coil for communication via said contact-free interface.

34. The identification element of claim 30, wherein said element is a transponder comprising an infrared transceiver for communication via said contact-free interface.

35. The identification element of claim 30, wherein said element is a SIM card.

36. The identification element of claim 35, wherein said SIM card is a value card.

* * * * *

UNITED STATES PATENT AND TRADEMARK OFFICE
CERTIFICATE OF CORRECTION

PATENT NO. : 8,165,965 B2  Page 1 of 1
APPLICATION NO. : 10/831105
DATED : April 24, 2012
INVENTOR(S) : Rudolf Ritter It is certified that error appears in the above-identified patent and that said Letters Patent is hereby corrected as shown below:

On title page, item (63) Related U.S. Application Data
replace "Continuation of application No. 09/462,117, filed as application No. PCT/CH98/0086 on March 5, 1998, now abandoned"
with --Continuation of application No. 09/462,117, filed December 23, 1999, now abandoned, which is a National Phase Application of PCT/CH98/00086, filed March 5, 1998.--

On title page, add item (30) Related Foreign Application Priority Data, and insert the following:
--Switzerland Patent Application No. 1564/97, filed June 27, 1997.--

Signed and Sealed this
Twelfth Day of June, 2012

David J. Kappos
*Director of the United States Patent and Trademark Office*